US011887383B2

United States Patent
Turcot et al.

(10) Patent No.: US 11,887,383 B2
(45) Date of Patent: Jan. 30, 2024

(54) VEHICLE INTERIOR OBJECT MANAGEMENT

(71) Applicant: Affectiva, Inc., Boston, MA (US)

(72) Inventors: Panu James Turcot, Pacifica, CA (US); Rana el Kaliouby, Milton, MA (US); Abdelrahman N. Mahmoud, Somerville, MA (US); Mohamed Ezzeldin Abdelmonem Ahmed Mohamed, Cairo (EG); Andrew Todd Zeilman, Beverly, MA (US); Gabriele Zijderveld, Somerville, MA (US)

(73) Assignee: Affectiva, Inc., Boston, MA (US)

( * ) Notice: Subject to any disclaimer, the term of this patent is extended or adjusted under 35 U.S.C. 154(b) by 77 days.

(21) Appl. No.: 17/005,374

(22) Filed: Aug. 28, 2020

(65) Prior Publication Data

US 2020/0394428 A1 Dec. 17, 2020

Related U.S. Application Data

(63) Continuation-in-part of application No. 16/833,828, filed on Mar. 30, 2020.

(Continued)

(51) Int. Cl.
*G06V 20/59* (2022.01)
(52) U.S. Cl.
CPC .................... *G06V 20/59* (2022.01)
(58) Field of Classification Search
CPC .................................................... G06V 20/59

(Continued)

(56) References Cited

U.S. PATENT DOCUMENTS 3,034,500 A 5/1962 Backster, Jr.
3,548,806 A 12/1970 Fisher
(Continued)

FOREIGN PATENT DOCUMENTS

JP 08115367 7/1996
KR 10-2005-0021759 A 3/2005
(Continued)

OTHER PUBLICATIONS

Rana Ayman El Kaliouby, Mind-reading machines: automated inference of complex mental states, Jul. 2005, University of Cambridge, Cambridge, United Kingdom.
(Continued)

*Primary Examiner* — Wednel Cadeau
(74) *Attorney, Agent, or Firm* — Adams Intellex, PLC

(57) ABSTRACT

Vehicle interior object management uses analysis for detection of an object within a vehicle. The object can include a cell phone, a computing device, a briefcase, a wallet, a purse, or luggage. The object can include a child or a pet. A distance between an occupant and the object can be calculated. The object can be within a reachable distance of the occupant. Two or more images of a vehicle interior are collected using imaging devices within the vehicle. The images are analyzed to detect an object within the vehicle. The object is classified. A level of interaction is estimated between an occupant of the vehicle and the object within the vehicle. The object can be determined to have been left behind once the occupant leaves the vehicle. A control element of the vehicle is changed based on the classifying and the level of interaction.

29 Claims, 13 Drawing Sheets

Related U.S. Application Data

(60) Provisional application No. 62/955,493, filed on Dec. 31, 2019, provisional application No. 62/954,833, filed on Dec. 30, 2019, provisional application No. 62/954,819, filed on Dec. 30, 2019, provisional application No. 62/925,990, filed on Oct. 25, 2019, provisional application No. 62/926,009, filed on Oct. 25, 2019, provisional application No. 62/893,298, filed on Aug. 29, 2019, provisional application No. 62/827,088, filed on Mar. 31, 2019.

(58) Field of Classification Search
USPC .......................................................... 382/103
See application file for complete search history.

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore., Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,724,920 B1 | 4/2004 | Berenz et al. |
| 6,792,458 B1 | 9/2004 | Muret et al. |
| 6,847,376 B2 | 1/2005 | Engeldrum et al. |
| 6,927,694 B1 | 8/2005 | Smith et al. |
| 7,003,135 B2 | 2/2006 | Hsieh et al. |
| 7,013,478 B1 | 3/2006 | Hendricks et al. |
| 7,027,621 B1 | 4/2006 | Prokoski |
| 7,110,570 B1 | 9/2006 | Berenz et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Edorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,300,891 B2 | 10/2012 | Chen et al. |
| 8,369,608 B2 | 2/2013 | Gunaratne |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 8,947,217 B2 | 2/2015 | Moussa et al. |
| 10,322,728 B1 | 6/2019 | Porikli et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0283055 A1 | 12/2005 | Shirai et al. |

(56) References Cited

U.S. PATENT DOCUMENTS

| | | |
|---|---|---|
| 2005/0289582 A1 | 12/2005 | Tavares et al. |
| 2006/0011399 A1 | 1/2006 | Brockway et al. |
| 2006/0019224 A1 | 1/2006 | Behar et al. |
| 2006/0143647 A1 | 6/2006 | Bill |
| 2006/0149428 A1 | 7/2006 | Kim et al. |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0167757 A1 | 7/2008 | Kanevsky et al. |
| 2008/0184170 A1 | 7/2008 | Periyalwar |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0209829 A1 | 8/2009 | Yanagidaira et al. |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0285456 A1 | 11/2009 | Moon et al. |
| 2009/0299840 A1 | 12/2009 | Smith |
| 2010/0070523 A1 | 3/2010 | Delgo et al. |
| 2010/0099955 A1 | 4/2010 | Thomas et al. |
| 2010/0134302 A1 | 6/2010 | Ahn et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0109452 A1 | 5/2012 | Autran et al. |
| 2012/0150430 A1 | 6/2012 | French et al. |
| 2012/0271484 A1 | 10/2012 | Feit et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2014/0171752 A1 | 6/2014 | Park et al. |
| 2014/0172910 A1 | 6/2014 | Jung et al. |
| 2014/0218187 A1 | 8/2014 | Chun et al. |
| 2014/0276090 A1 | 9/2014 | Breed |
| 2015/0258995 A1 | 9/2015 | Essers et al. |
| 2016/0104486 A1 | 4/2016 | Penilla et al. |
| 2017/0003784 A1 | 1/2017 | Garg et al. |
| 2017/0297587 A1* | 10/2017 | Mimura .......... B60W 30/18163 |
| 2018/0050696 A1 | 2/2018 | Misu et al. |
| 2018/0251122 A1 | 9/2018 | Golston et al. |
| 2019/0135325 A1 | 5/2019 | Lisseman et al. |
| 2019/0176837 A1 | 6/2019 | Williams et al. |
| 2019/0225232 A1 | 7/2019 | Blau |
| 2020/0103980 A1* | 4/2020 | Katz ...................... G06F 3/167 |
| 2020/0171977 A1 | 6/2020 | Jales Costa et al. |
| 2020/0223362 A1 | 7/2020 | Witte |
| 2020/0285871 A1 | 9/2020 | Tokizaki et al. |
| 2020/0130528 A1 | 10/2020 | Upmanue et al. |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

International Search Report dated Nov. 14, 2011 for PCT/US2011/039282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG-EBGM." Pattern Recognition Letters 29.10 (2008): 1537-1543.

Fasel, B. (Aug. 2002). Robust face analysis using convolutional neural networks. In Object recognition supported by user interaction for service robots (vol. 2, pp. 40-43). IEEE.

Matsugu, M., Mori, K., Mitari, Y., & Kaneda, Y. (2003). Subject independent facial expression recognition with robust face detection using a convolutional neural network. Neural Networks, 16(5-6), 555-559.

* cited by examiner

VEHICLE INTERIOR OBJECT MANAGEMENT

RELATED APPLICATIONS

This application claims the benefit of U.S. provisional patent applications "Vehicle Interior Object Management" Ser. No. 62/893,298, filed Aug. 29, 2019, "Deep Learning In Situ Retraining" Ser. No. 62/925,990, filed Oct. 25, 2019, "Data Versioning for Neural Network Training" Ser. No. 62/926,009, filed Oct. 25, 2019, "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, and "Autonomous Vehicle Control Using Longitudinal Profile Generation" Ser. No. 62/955,493, filed Dec. 31, 2019.

This application is also a continuation-in-part of U.S. patent application "Vehicular In-Cabin Sensing Using Machine Learning" Ser. No. 16/833,828, filed Mar. 30, 2020, which claims the benefit of U.S. provisional patent applications "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, "Autonomous Vehicle Control Using Longitudinal Profile Generation" Ser. No. 62/955,493, filed Dec. 31, 2019, "Image Analysis for Human Perception Artificial Intelligence" Ser. No. 62/827,088, filed Mar. 31, 2019, "Vehicle Interior Object Management" Ser. No. 62/893,298, filed Aug. 29, 2019, "Deep Learning In Situ Retraining" Ser. No. 62/925,990, filed Oct. 25, 2019, and "Data Versioning for Neural Network Training" Ser. No. 62/926,009, filed Oct. 25, 2019.

Each of the foregoing applications is hereby incorporated by reference in its entirety.

FIELD OF INVENTION

This application relates generally to vehicle management and more particularly to vehicle interior object management.

BACKGROUND

The array of electronic devices that pervade our daily lives is truly dazzling. Whether small, portable devices, or larger more powerful ones, most people would have a difficult time coping with modern life without their favorite electronic devices. The electronic devices or "gadgets" include personal, wearable and jewelry items such as rings that store data and control other devices; watches that track wake/sleep cycles and monthly cycles, count every step taken during a 24 hour period, track exercise statistics, and display messages, email, maps with travel instructions; and much more. Personal items such as glasses improve vision while displaying a wide range of information including data, markers, highlights, and instructions. The glasses can also capture and record every activity and interpersonal interaction of a person's day by using built-in cameras and microphones, although such recording has caused strong social pushback. While each of these items is impressive in its own right, more powerful items are also highly popular. The most popular personal electronic device is without question the smartphone, which due to its small size makes it highly portable. While these devices can be used for making and receiving telephone calls, their great strengths lie in the apps that execute on the smartphones. The apps enable the phones to store personal information about the user including personalized settings, payment information, and medical information. The apps provide address books, calendars, photos, and files, as well as apps that can create, edit, or delete any of these items. Other popular electronic devices include tablets which like smartphones are portable and offer larger screen sizes. Personal digital assistants (PDAs) and game controllers also are often found in the possession of mobile people. Laptop computers are also highly popular although less portable than a smartphone or tablet.

People engage with their various personal electronic devices and computers for school, play, ordering food, and finding their way around town, among myriad other uses. The personal electronic devices are also widely used for work by using apps for video conferencing, file sharing, collaboration, and common work communication via email, chat, and telephone calls, thus enabling collaboration among widely dispersed employees. Many people use their personal electronic devices to consume many types of online content for information, entertainment, and diversion. Further, people use their devices and computers to participate in social networks and social media. The online content includes news, sports, politics, educational information, adorable puppy videos, bears sleeping in kiddy pools videos, and much, much more. The social networks are appealing because they easily support sharing of, discussions of, and commentary on a wide range of topics. Users of social networks engage these online platforms or "digital soapboxes" to boast about their accomplishments, share, rant about politics at the local, national, and global levels, and partake in other popular social activities. The topics include personal topics such as birthday parties and vacations, plus reactions to content posted by friends; and general interest topics such as announcements for presentations by a wide range of civic, educational, and religious groups. The topics can also include political ones ranging from get out the vote rallies and peaceful demonstrations, to violent demonstrations and destruction. Conspiracy theories and misinformation are also popular in some quarters.

The social networks enable a feeling of connectedness, albeit through a screen, when in-person interactions are otherwise not possible. The networks enable friends, family, and followers to 'keep in touch", even over great geographic distances. While the social networks are not in their own rights completely sufficient replacements for face-to-face interactions, the online interactions supported by the personal electronic devices are often believed by the users to be surprisingly close. Social networks are very effective at conveying messages that the message authors want to share. The social networks can also collect information from the various participants to learn about the them, to suggest content that might be of interest to the participants, and to track the types of information that are emerging and/or popular on the social networks. This last type of data is used in order to determine the social media content that is "trending". The trending information is used to track political activity, the spread of disease throughout a population, and the latest celebrity gossip among many other possibilities.

SUMMARY

In disclosed techniques, vehicle interior object management uses analysis for detection of an object within a vehicle. An occupant of the vehicle can interact with the object. The object within the vehicle can be an electronic device such as a cell phone or a computing device; a personal item such as a briefcase, a wallet, a purse, or luggage; and so on. The object can further include a child or a pet. The vehicle occupant can be the vehicle driver or operator, a passenger within the vehicle, and so on. A location or position for the object can be detected. An occupant location within the vehicle can be determined, as can a distance between the object and the occupant. The distance between the object and the occupant, as well as other parameters, can be used to determine a level or degree of interaction between the occupant and the object. The interaction between the occupant and the object can include tactile interaction or voice interaction. The interaction can further include human perception AI interaction, where human perception AI interaction can include cognitive states such as drowsiness or distraction. The interaction between the occupant and the object can be based on a level of interaction. The level of interaction can be used to determine an interaction metric. Control elements of the vehicle in which the occupant is located can be changed based on the level of interaction between the occupant and the object. The control elements of the vehicle can be further changed based on classifying, where the classifying provides information on object interference with the occupant. The control elements that can be changed can include control elements within an autonomous or semiautonomous vehicle. The control elements can include performing a lock out operation; recommending a break for the occupant; recommending a different route; recommending how far to drive; responding to traffic; responding to weather; adjusting seats, mirrors, climate control, lighting, music, audio stimuli, or interior temperature; brake activation; or steering control. The control element of the vehicle can be used for optimization of the autonomous or semiautonomous vehicle.

Vehicle interior object management can detect objects. In-vehicle sensors can be used for data collection, such as a microphone for collecting audio data or voice data, and other sensors for collecting physiological data. Images of a vehicle interior can be collected using imaging devices. The images can include video, intermittent video, still images, and the like. The images can include facial data, upper torso data, etc. The vehicle can be a first vehicle, a second vehicle, a third vehicle, a public transportation vehicle, etc. The images can include images based on various spectra of light such as visible light images or near-infrared (NIR) images. An object within the vehicle can be detected by analyzing the images. The detection can be based on machine learning. The detected object can be classified to determine a type of object such as an electronic device, a personal device, a child, a pet, and the like. The object can be classified to provide information on object interference with the occupant. The classifying can be based on machine learning. A location for the occupant within the vehicle interior can be determined. The occupant can be located at the front of or to the back of the vehicle. The occupant can be in a driver or operator position for the vehicle. The occupant can be a passenger within the vehicle. Estimating the level of interaction between the occupant and the object includes calculating an interaction metric. The interaction metric can include a score or value, a percentage, a qualifier such as high interference or low interference, and so on.

A computer-implemented method for vehicle management is disclosed comprising: collecting two or more images of a vehicle interior using one or more imaging devices within the vehicle; analyzing the two or more images to detect an object within the vehicle; classifying the object within the vehicle; estimating a level of interaction between the object and an occupant of the vehicle; and changing a control element of the vehicle based on the classifying and the level of interaction. Some embodiments include calculating a distance between the object and the occupant. Some embodiments include determining if the object is within a reachable distance of the occupant. In some embodiments, the estimating the level of interaction is further based on other sensors within the vehicle. In some embodiments, the analyzing includes determining if the object is being held by the occupant. The occupant of the vehicle can be a driver or operator of the vehicle, a passenger within the vehicle, a custodial driver of the vehicle, etc. The vehicle in which the individual is traveling can be an autonomous vehicle or a semi-autonomous vehicle. In embodiments, the occupant can be notified that an object has been left behind after the occupant has exited the vehicle.

Various features, aspects, and advantages of numerous embodiments will become more apparent from the following description.

BRIEF DESCRIPTION OF THE DRAWINGS

The following detailed description of certain embodiments may be understood by reference to the following figures wherein.

DETAILED DESCRIPTION

Figure 1:
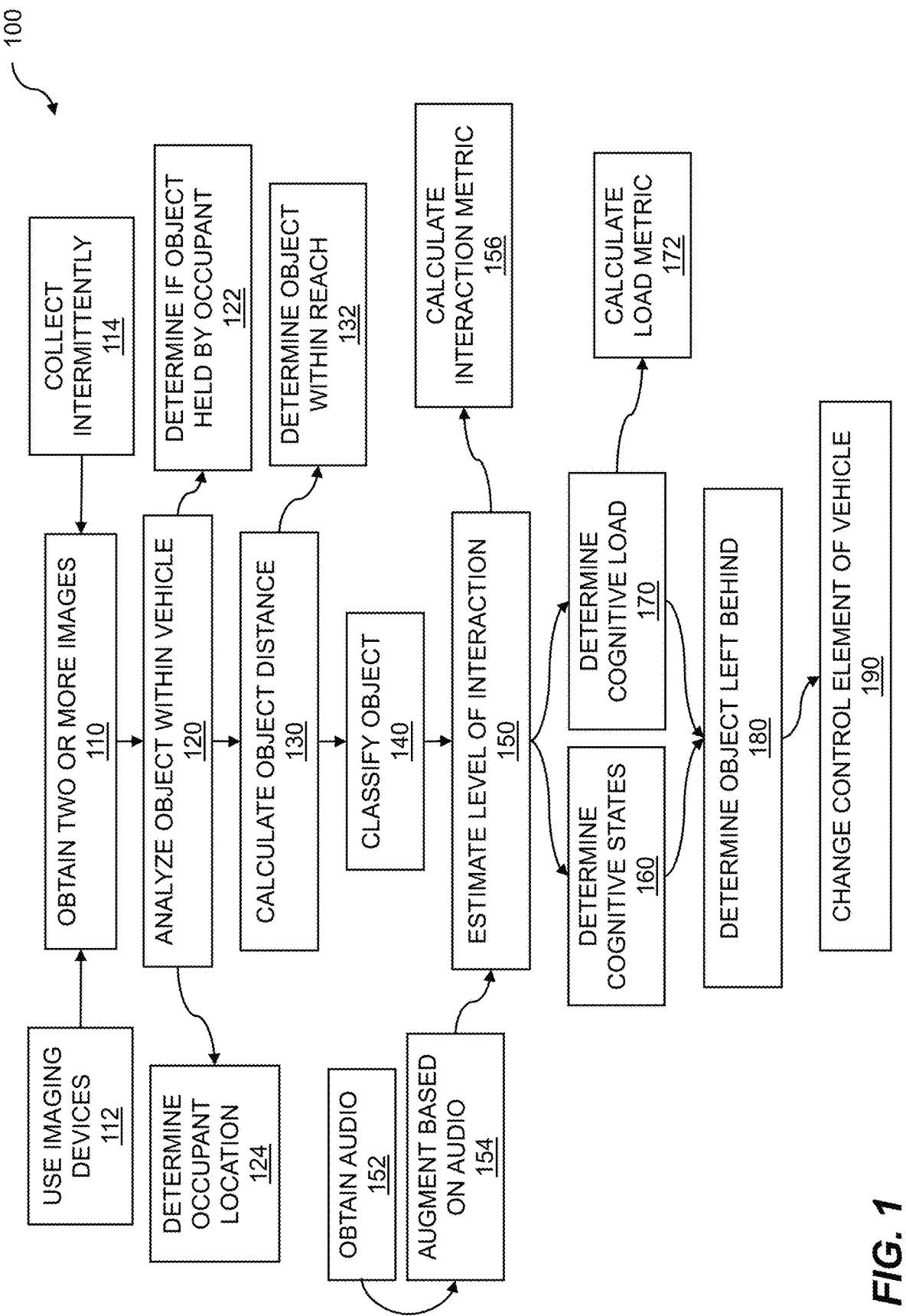
FIG. 1 is a flow diagram for vehicle interior object management.

People live and work in a wide range of regions, places, and environments. The residences of these people are located in areas as diverse as densely populated cities, sparsely populated rolling hills, open plains, woodlands, or even onboard a boat. Irrespective of whether they live in urban, suburban, or rural areas, people spend hundreds or more hours per year traveling in vehicles. The vehicles include public vehicles, private vehicles, and "alternative" vehicles. The most frequently used vehicles include public buses, trains, or airplanes; private vehicles such as automobiles or motorcycles; commercial vehicles such as taxis or ride share vehicles; and so on. The hours spent by individuals in vehicles are consumed while commuting to and from work or school, running errands or shopping, keeping meetings and appointments, traveling, etc. Much of this travel time reduces the opportunity for more productive pursuits such as time with friends and family, creating, or exercising.

As a person is traveling within or atop a vehicle, that person can experience a wide range of cognitive states. The types and ranges of cognitive states can be determined by analyzing cognitive state data collected from the individual. The cognitive state data that is analyzed can include image data, facial data, audio data, voice data, speech data, non-speech vocalizations, physiological data, torso data, and the like. Further to the analysis of the cognitive state data from images, audio, etc., the cognitive state or states of the individual can be influenced by interactions between the person and an object within the vehicle. An object within a vehicle can be identified using image analysis of images collected of a vehicle interior. The individual can be holding the object, looking at the object, talking to the object, reading from the object, and so on. Depending on what the person is doing with the object, the level of interaction between the person and the object can vary from a high level of interaction to a low level of interaction. For example, an individual reading and sending email from their smartphone can experience a high level of interaction with the smartphone, while an individual holding on to a personal item such as a purse or wallet can experience a low level of interaction. A high level of interaction between the individual and the object not only affects cognitive state, but it can also directly impact the ability of the individual to safely operate the vehicle, to navigate a travel route, or even to travel safely with other occupants of the vehicle. By estimating a level of interaction between the individual occupant of a vehicle and an object with the vehicle, various elements of a vehicle can be controlled. Control of one or more elements within the vehicle is particularly applicable to vehicles such as autonomous vehicles or semiautonomous vehicles. Even for traditional, independently operated vehicles, the adjustment or change of a control element could include flashing or sounding a warning to the individual to pay more attention to their vehicle operation.

In disclosed techniques, vehicle interior object management uses analysis for detection of an object within a vehicle. An occupant of the vehicle can interact with the object. The object within the vehicle can be an electronic device such as a cell phone or a computing device; a personal item such as a briefcase, a wallet, a purse, or luggage; and so on. The object can further include a child or a pet. The vehicle occupant can be the vehicle driver or operator, a passenger within the vehicle, and so on. A location or position for the object can be detected. An occupant location within the vehicle can be determined, as can a distance between the object and the occupant. The distance between the object and the occupant, as well as other parameters, can be used to determine a level or degree of interaction between the occupant and the object. The interaction between the occupant and the object can include tactile interaction or voice interaction. The interaction can further include human perception AI interaction, where human perception AI interaction can include cognitive states such as drowsiness or distraction. The interaction between the occupant and the object can be based on a level of interaction. The level of interaction can be used to determine an interaction metric. Control elements of the vehicle in which the occupant is located can be changed based on the level of interaction between the occupant and the object. The control elements of the vehicle can be further changed based on classifying, where the classifying provides information on object interference with the occupant. The control elements that can be changed can include control elements within an autonomous or semiautonomous vehicle. The control elements can include performing a lock out operation; recommending a break for the occupant; recommending a different route; recommending how far to drive; responding to traffic; responding to weather; adjusting seats, mirrors, climate control, lighting, music, audio stimuli, or interior temperature; brake activation; or steering control. The control element of the vehicle can be used for optimization of the autonomous or semiautonomous vehicle. Image analysis is used for vehicle object management. The image processing can be based on techniques such as machine learning. An occupant within a vehicle can interact with an object detected within the vehicle, where the detecting is based on analyzing images of the vehicle interior. The interaction between the occupant and the object can include holding or touching the object, looking at or talking to the object, and the like. The detected object can be classified, where the classifying provides information on object interference with the occupant. Object interference can include preventing the occupant from operating the vehicle safely through distraction, annoyance, etc.

Images of a vehicle interior are collected using imaging devices within the vehicle. Various devices can be used for collecting the images. The imaging devices can include cameras, where the cameras can include a video camera, a still camera, a camera array, a plenoptic camera, a web-enabled camera, a visible light camera, a near-infrared (NIR) camera, a heat camera, and so on. The images are analyzed to detect an object within the vehicle. Detection of the object can be based on object identification, location, position, and so on. The object is classified, where the classifying provides information on what the object is. A level of interference with the occupant may be determined. For example, a closed umbrella lying on a vehicle seat may produce a lower level of interference than a cell phone held in an occupant's hand at shoulder height. A level of interaction between the object and an occupant of the vehicle is estimated. The level of interaction can range from "aloof" for a low level of interaction to "engrossed" for a high level of interaction. A control element of the vehicle is changed based on the classifying and the level of interaction. The control element that is changed can include sounding or displaying an alert, recommending that the operator take a break, transferring vehicle control from the vehicle occupant to semiautonomous or autonomous operation, etc. The changing the control element can include transferring control from the occupant of the vehicle to the vehicle. In other embodiments, the vehicle is a semiautonomous vehicle and the occupant is a driver of the vehicle during a portion of a trip by the vehicle.

FIG. 1 is a flow diagram for vehicle interior object management. Various control elements of a vehicle can be changed based on interaction between a vehicle occupant and an object within the vehicle. Vehicle occupants who are interacting at a high level with an object within the vehicle are typically unable to operate the vehicle safely or effectively. Images of a vehicle interior are collected, where the images can include video, still images, or near-infrared (NIR) images. The images are analyzed to detect an object within the vehicle. The object can include an electronic device, a personal item, a child, a pet, and so on. A level of interaction between the occupant and the object is classified. A level of interaction between the occupant and the object is estimated. The level of interaction can include a range of levels from a low level of interaction to a high level of interaction. Based on the classifying and the level of interaction, a control element of the vehicle can be changed. The control element can include a lock-out function, taking a break, recommending an alternate travel route, and so on. For a high level of interaction, the control element can include brake activation or steering control.

The flow 100 includes collecting two or more images 110 of a vehicle interior. The two or more images can include video, video frames, still images, near-infrared (NIR) images, and so on. In embodiments, the collecting images can be accomplished using one or more imaging devices 112 within a vehicle comprising the vehicle interior. An imaging device can include a camera or other imaging device. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In other embodiments, an imaging device within the plurality of imaging devices can include an infrared imaging device. The imaging can be collected continuously. In other embodiments, the imaging can be collected on an intermittent basis 114. The intermittent collecting can be based on availability of an imaging device, a clear line of sight within the vehicle, etc. Additional imaging can be collected, where the additional imaging can include images such as video images, still images, etc. In embodiments, the additional images are collected from the vehicle interior. Collecting images can occur at various points in time. In embodiments, the additional images can be collected during a current vehicle journey by an occupant. The images can be collected during other vehicle journeys. In embodiments, the additional images can be collected during a previous vehicle journey by the occupant. The imaging that is collected may or may not include the vehicle occupant. Further embodiments can include collecting earlier images from the vehicle interior prior to the occupant arriving at the vehicle. The collecting earlier imaging from the vehicle interior prior to the occupant arriving at the vehicle can be used for a variety of techniques such as mapping the vehicle interior.

The flow 100 includes analyzing the two or more images to detect an object 120 within the vehicle. The detecting of the object within the vehicle interior can be based on one or more image analysis techniques. The object can include a cell phone, a computing device, a briefcase, a wallet, a purse, or luggage. The image analysis techniques can include edge detection, identification of shapes, identification of textures, and the like. The image analysis techniques can be based on using one or more classifiers. The classifiers can be used to detect an electronic device such as a smartphone or tablet, a personal item, and the like. In embodiments, the analyzing can include determining if the object is being held 122 by the occupant. A variety of types of objects can be held by the occupant. In embodiments, the object can be a cell phone. The cell phone can include a smartphone. In embodiments, the object includes a voice-activated device. The occupant can be sending text messages or email, talking on the cell phone, etc. In other embodiments, the object can be a computing device. The computing device can include a phone or PDA, a tablet computer, a laptop computer, and so on. In further embodiments, the computing device can include GPS services. The GPS services can be used for locating the vehicle, providing maps or travel route instructions, and the like. The computing device can provide business location information. Business location information can include locations of fuel stations, restaurants, hotels, etc. The business location information can provide other information such as products and services offered, special offers, prices, and the like. In embodiments, detection of the occupant is based on identifying an upper torso of the occupant. The identifying the upper torso of the occupant can further be based on extracting upper body data for the occupant from the imaging. In embodiments, the upper body data is used to identify the upper torso of the occupant. The two or more images can include torso location information for the occupant. Other techniques can be included with the detecting the occupant within the vehicle.

In the flow 100, the analyzing includes determining occupant location 124 within the vehicle. Stated throughout, the occupant within the vehicle can be located at various positions within the vehicle. The occupant can be located toward the front of the vehicle or the back of the vehicle, near the middle of the vehicle, to the left of the vehicle or the right of the vehicle, and so on. In further embodiments, the determining occupant location provides a vehicle seating map. The vehicle seating map can indicate the location of one or more occupants within the vehicle. The location of the occupant within the vehicle can include a driver, operator, supervisor, or similar position within the vehicle. The location of the occupant within the vehicle can include a passenger position. In embodiments, the vehicle seating data can include an occupant count for the vehicle. The location of other occupants of the vehicle can also be determined. Further embodiments can include determining a location for the second occupant.

The flow 100 further includes calculating a distance 130 between the object and the occupant. The occupant can be sitting or standing at various positions within the vehicle. The object can be located or placed at various positions, laid on a seat or dashboard, and the like. The object may be within sight of the occupant, usable by the occupant, or neither in sight nor usable. Embodiments include determining if the object is within a reachable distance 132 of the occupant. An object within reachable distance of the occupant may be usable by the occupant. The flow 100 includes classifying the object 140 within the vehicle. Discussed previously, the classifying the object can include determining a type of object, the location of the object, etc. In embodiments, the classifying provides information on object interference with the occupant. The object interference can include a value or range of values, a percentage, a qualification such as "interferes" or "does not interfere", and so on.

The flow 100 includes estimating a level of interaction 150 between the object and an occupant of the vehicle. The level of interaction can include a high level of interaction, a low level of interaction, and the like. A high level of interaction can cause the driver to be distracted, while a low level of interaction may have little or no effect on the occupant of the vehicle. The estimating can be used for a variety of purposes. In embodiments, the estimating can include determining tactile interaction between the occupant and the object. Tactile interaction between the occupant and the object can include holding the object, touching the object such as tapping a touch screen, adjusting settings of the object, etc. In other embodiments, the estimating can include determining voice interaction between the occupant and the object. Voice interactions between the occupant and the object can include speaking to a smart digital assistant such as Siri™, Alexa™, or Cortana™, talking on the phone, and so on. In further embodiments, the estimating can include determining human perception AI interaction between the occupant and the object. Human perception AI interaction can include one or more complex cognitive states of the occupant such as drowsiness or impairment. In embodiments, the estimating can include determining a level of distractedness by the occupant. The flow 100 further includes obtaining audio information 152. The audio information can include audio collected within the vehicle, around the vehicle, and so on. The audio information can include speech, where the speech can include a conversation within the vehicle, a conversation on a smartphone, etc. The audio information can include non-speech vocalizations. In embodiments the non-speech vocalizations can include grunts, yelps, squeals, snoring, sighs, laughter, filled pauses, unfilled pauses, or yawns. The flow 100 includes augmenting 154 the estimating based on the audio information. The augmenting can include synchronizing audio information such as a laugh with video information that shows the vehicle occupant laughing. The estimating the level of interaction 150 can include calculating an interaction metric 156. The interaction metric can include a value, a range, or a percentage. The metric can be based on meeting or exceeding a threshold. The metric can be based on a determination such as, "The vehicle occupant is distracted."

The flow 100 further includes determining cognitive states 160 of the occupant, based on the analyzing, the estimating, and the classifying. The occupant can experience a variety of cognitive states based on the interaction between the occupant of the vehicle and the object within the vehicle. In embodiments, the cognitive states of the occupant can include one or more of drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

The flow 100 further includes determining a cognitive load 170 for the occupant based on the level of interaction. Discussed throughout, cognitive effort or cognitive load can describe how people use their working memory, such as a cognitive system with relatively limited capacity. The person's working memory can be used for temporary storage in which information can be held and processed. By comparison, long term memory is used for storing or "remembering" information. Cognitive load can include intrinsic cognitive load, which can include an amount of cognitive effort that can relate to a specific task. Cognitive load can also comprise extraneous cognitive load, which can refer to one or more techniques that can be used for presenting tasks, information, and so on, to a learner. Cognitive load can include germane cognitive load, which can refer to an amount of cognitive work required to create a permanent store of knowledge. In embodiments, the determining a cognitive load can include calculating a cognitive load metric 172. A cognitive load metric can include a value, a range of values, a percentage, a threshold, and so on. The cognitive load metric can include a qualification such as "yes" or "no".

The flow 100 further includes determining that the object was left behind 180 once the occupant leaves the vehicle. The object that was left behind can include a personal electronic device such as a cellphone, a smartphone, a tablet, a laptop, and so on. The object that was left behind can include a personal item such as a purse, a wallet, a briefcase, a suitcase or travel bag, etc. The object that was left behind can include a child or a pet. The determining that an object was left behind when the occupant leaves the vehicle can be used to send a text message or email, to flash a signal or indicator, to sound an alert, and the like. The flow 100 includes changing a control element of the vehicle 190 based on the classifying and the level of interaction. The vehicle for which a control element can be changed can include an independently operated vehicle, a semi-autonomous vehicle, an autonomous vehicle, and so on. The control element can include a variety of controls or adjustments to the vehicle. In embodiments, the changing of the control element includes performing a lock out operation; recommending a break for the occupant; recommending a different route; recommending how far to drive; responding to traffic; responding to weather; adjusting seats, mirrors, climate control, lighting, music, audio stimuli, or interior temperature; brake activation; or steering control. The changing the control element can be used to alter a cognitive state of the vehicle occupant such as selecting an audio track to calm the occupant. The changing the control can enhance operation of the vehicle. In embodiments, the control element of the vehicle is used for optimization of the autonomous or semiautonomous vehicle. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
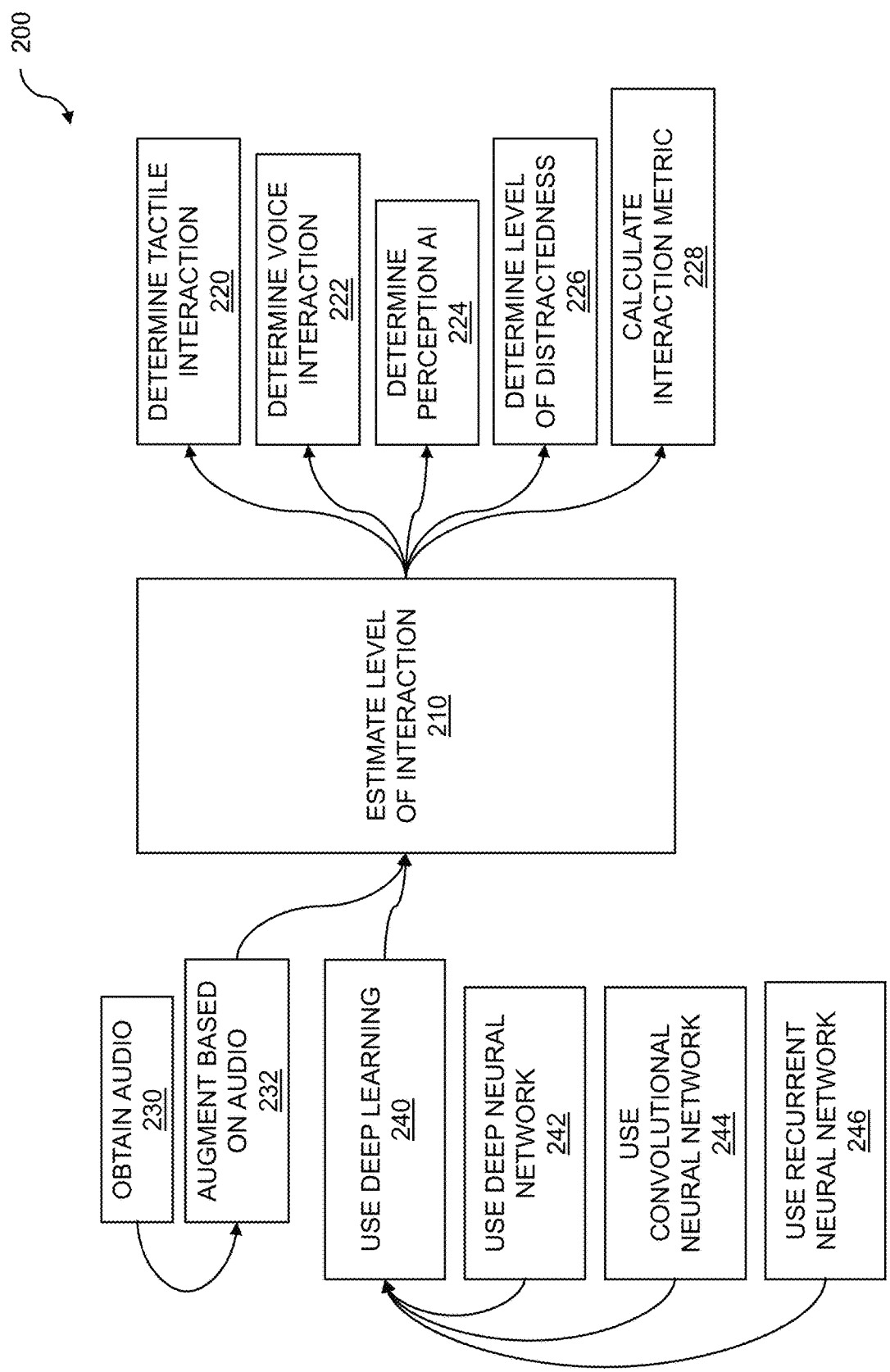
FIG. 2 is a flow diagram for estimating level of interaction.

FIG. 2 is a flow diagram for estimating level of interaction. Described throughout, an occupant of a vehicle can interact with an object within the vehicle. The object can include a person or pet, an electronic device, a personal device, and so on. The interaction between the occupant and the object can be determined using image processing techniques. Depending on the level, degree, or intensity of the interaction between the individual and the object, the vehicle occupant can perform other tasks such as operating the vehicle. Estimating a level of interaction enables vehicle object management. Images of a vehicle interior are collected using one or more imaging devices within the vehicle. The images are analyzed to detect an object within the vehicle. The object within the vehicle is classified. A level of interaction between an occupant of the vehicle and the object within the vehicle is estimated. A control element of the vehicle is changed based on the classifying and the level of interaction.

The flow 200 includes estimating a level of interaction 210 between an occupant of the vehicle and the object within the vehicle. The estimating the level of interaction can include calculating a value or percentage, comparing to a threshold, applying a qualifier such as "yes" or "no", and so on. The estimating the level of interaction can be based on whether the object is within reach of the vehicle occupant or not within reach. The estimating the level of interaction can be based on whether the occupant of the vehicle is holding the object or not. In embodiments, the estimating the level of interaction can be further based on other sensors within the vehicle. The other sensors within the vehicle can be used to detect motion of the occupant, to collect physio data from the occupant, and so on. In the flow 200, the estimating can include determining tactile interaction 220 between the occupant and the object. Tactile interaction between the occupant and the object can include the occupant holding the object, touching the object, adjusting settings of the object, and so on. In the flow 200, the estimating can include determining voice interaction 222 between the occupant and the object. The voice interaction between the occupant and the object can include speaking instructions to a digital assistant such as Siri™, Alex™, Cortana™, and the like. The voice interaction can include speaking into a voice recorder, talking on a cellphone, etc. In the flow 200, the estimating can include determining human perception AI interaction 224 between the occupant and the object. Determining human perception AI can include determining complex cognitive states experienced by the occupant of the vehicle. Complex cognitive states that can be experienced by the occupant of the vehicle can include one or more of drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

In the flow 200, the estimating can include determining a level of distractedness 226 by the occupant. An occupant of a vehicle can exhibit distractedness due to a variety of factors, stimuli, and so on. The occupant of the vehicle may be trying to perform tasks unrelated to operating the vehicle such as sending and receiving SMS (text) messages or emails, talking on a cellphone, performing personal grooming tasks, and so on. The occupant may be distracted by trying to read a map or follow instructions. Described throughout, the vehicle occupant can be distracted by an object. In embodiments, classifying the object can provide information on object interference with the occupant. In the flow 200, the estimating the level of interaction can include calculating an interaction metric 228. The interaction metric can include a value, a range, or a percentage. The metric can be based on meeting or exceeding a threshold. The metric can be based on a determination such as, "The vehicle occupant is distracted".

In the flow 200 includes obtaining audio information 230. The audio information can include audio information collected within the vehicle, beyond the vehicle, and so on. The audio information can include audio generated by the vehicle occupant. In embodiments, the audio information includes speech. The speech can include spoken words, song lyrics, etc. In other embodiments, the audio information includes non-speech vocalizations. The non-speech vocalizations can include other audio signals or sounds and can include a variety of sounds that can be generated by the vehicle occupant. In embodiments, the non-speech vocalizations can include grunts, yelps, squeals, snoring, sighs, laughter, filled pauses, unfilled pauses, or yawns. The obtained audio information can be used for a variety of purposes. The flow 200 further includes augmenting 232 the estimating based on the audio information. The augmenting can include matching audio data to image data. In a usage example, audio data including a laugh can be correlated or matched to video facial data of the vehicle occupant laughing. In the flow 200, the estimating is performed using deep learning 240. The deep learning can be used to improve the efficacy of the estimating. The estimating can benefit from improving convergence, reducing computation resources required by the estimating, reducing estimating time, and so on. The deep learning can be performed using a graph such as a data flow graph, a network, and so on. In embodiments, the deep learning is performed using a deep neural network 242. The deep neural network can include various layers, where the layers can include input layers, output layers, hidden layers, activation layers, bottleneck layers, and so on. In embodiments, the deep learning can be performed using a convolutional neural network 244. Other network topologies and configurations may also be used. In further embodiments, the deep learning is performed using a recurrent neural network 246. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
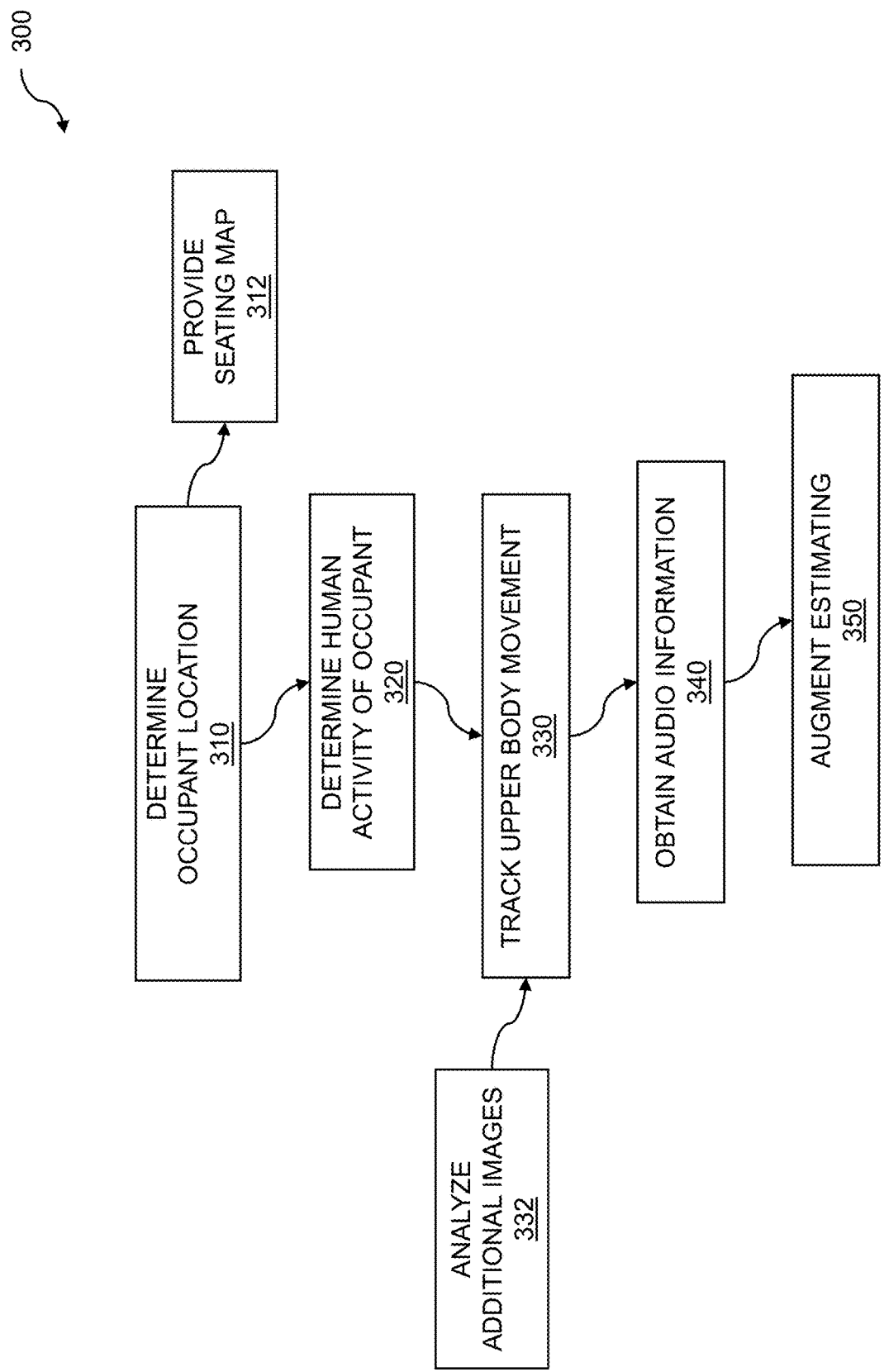
FIG. 3 is a flow diagram for determining occupant activity.

FIG. 3 is a flow diagram for determining occupant activity. A vehicle occupant can perform a variety of tasks within the vehicle. For an independently operated vehicle, the vehicle occupant can perform various vehicle operation tasks such as steering, accelerating and braking, indicating turns, adjusting climate controls, choosing a media presentation, and so on. In a semiautonomous or autonomous vehicle, the vehicle occupant can perform other tasks, where the other tasks can be independent from vehicle operation. Determining occupant activity based on image analysis enables vehicle object management. Images of a vehicle interior are collected using imaging devices within the vehicle. The images are analyzed to detect an object within the vehicle, and the object is classified. A level of interaction between an occupant of the vehicle and the object within the vehicle is estimated. A control element of the vehicle is changed based on the classifying and the level of interaction.

The flow 300 includes determining occupant location 310 within the vehicle. The occupant location within the vehicle can include a front portion, middle portion, or rear portion of the vehicle, an upper deck or lower deck, etc. The occupant location can include an operating position for the vehicle or a passenger position. In embodiments, the determining occupant location can provide a vehicle seating map 312. The vehicle seating map can include a location for the vehicle occupant, and one or more locations for one or more additional vehicle occupants. The flow 300 includes determining human activity of the occupant 320. The human activity can be determined based on various types of data such as image data collected of the vehicle interior. The data can include image data, facial data, torso data, audio data, sensor data, physio data, etc. In embodiments, the determining human activity can be based on analyzing images collected of the vehicle interior; estimating a level of interaction between an occupant and the object; and classifying the object. In embodiments, the human activity can include eating, sleeping, talking to one's own self, talking to another occupant of the vehicle, using a computer, talking on a cell phone, or looking at a mobile device.

The flow 300 further includes tracking upper body movement 330 of the occupant, based on the two or more images collected of the vehicle interior. The tracking upper body movement can include tracking an upper torso. The tracking upper body movement can include displacement of the torso such as displacing left or right; scale of the torso such as moving toward an imaging device to appear larger or moving away from the imaging device to appear smaller; rotation of the torso, etc. The upper body movements can be based on changing position of the head of the vehicle occupant, raising or lowering arms, and the like. In embodiments, the upper body movement can include tracking the hands of the occupant. Tracking hands of the occupant can include movement of the hands, determining whether an object is held in the hands, etc. In further embodiments, the tracking upper body movement can be based on analyzing additional images 332 collected of the vehicle interior. In embodiments, a wire-frame representation of the occupant's body can be constructed from the two or more images and used in the analysis. The wire-frame representation can reduce the amount of image data and simplify the image analysis. In embodiments, image data from multiple image sources can be deduplicated to reduce the amount of image data and simplify the analysis process.

The flow 300 further includes obtaining audio information 340. The audio information can be obtained using one or more of a microphone, an audio transducer, or another component able to collect audio data. The audio data can include sound generated within the vehicle and sound generated beyond the vehicle. In embodiments, the audio information can include speech. The speech can include speech generated by the vehicle occupant, by another vehicle occupant, by an audio selection being played within the vehicle, and so on. In other embodiments, the audio information can include non-speech vocalizations. The non-speech vocalizations can be generated by one or more vehicle occupant. In embodiments, the non-speech vocalizations can include grunts, yelps, squeals, snoring, sighs, laughter, filled pauses, unfilled pauses, or yawns. The flow 300 includes augmenting the estimating 350 based on the audio information. Recall that the estimating is for estimating a level of interaction between an occupant of the vehicle and the object within the vehicle. In embodiments the estimating the level of interaction can include calculating an interaction metric. The interaction metric can be calculated based on a value or score, a range of values, a percentage, a threshold, a qualifier such as "yes" or "no", and so on. Recall that a level of interaction based on an interaction metric can be used to change a control element of the vehicle. The changing of the control element can include performing a lock out operation; recommending a break for the occupant; recommending a different route; recommending how far to drive; responding to traffic; responding to weather; adjusting seats, mirrors, climate control, lighting, music, audio stimuli, or interior temperature; brake activation; or steering control. Various steps in the flow 300 may be changed in order, repeated, omitted, or the like without departing from the disclosed concepts. Various embodiments of the flow 300 can be included in a computer program product embodied in a non-transitory computer readable medium that includes code executable by one or more processors.

Figure 4:
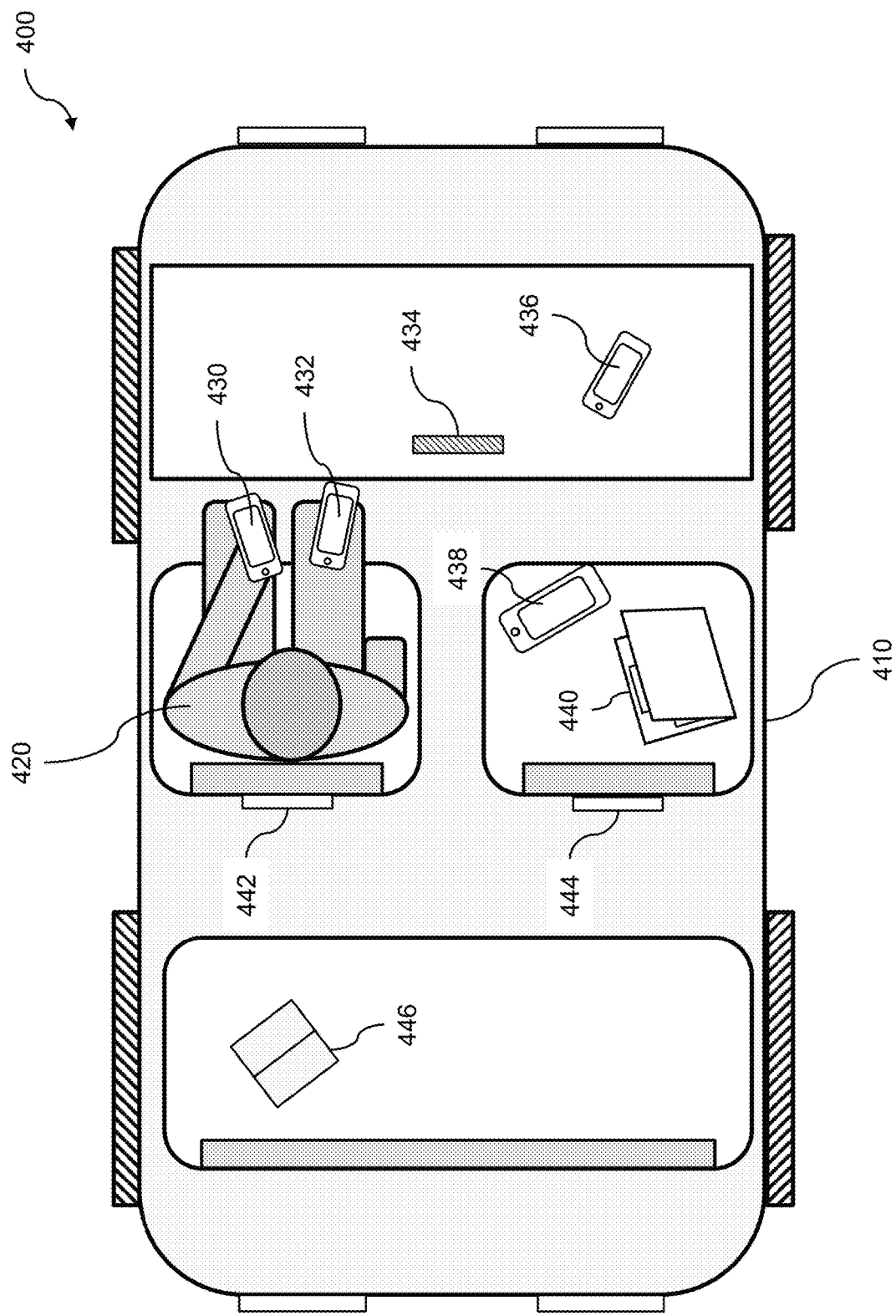
FIG. 4 shows a top view of occupant interactions with objects.

FIG. 4 shows a top view of occupant interactions with objects. Objects within a vehicle can be detected and classified in images collected of a vehicle interior. The items can include electronic devices, personal items, children, pets, and so on. Occupant interactions with objects are determined based on image analysis. The image analysis is used for vehicle object management. Images of a vehicle interior are collected using one or more imaging devices within the vehicle. The images are analyzed to detect an object within the vehicle, and the object is classified. A level of interaction between an occupant of the vehicle and the object within the vehicle is estimated. A control element of the vehicle is changed based on the classifying and the level of interaction.

A top view of a vehicle is shown in which a vehicle occupant can have various interactions with objects 400. The vehicle 410 can include a personal vehicle such as an automobile; a ride-share vehicle or taxi; a public vehicle such as a bus, train, or plane; and so on. The vehicle can be a semiautonomous vehicle, an autonomous vehicle, and so on. The vehicle occupant 420 can interact with a variety of objects within the vehicle. The objects can include handheld or hand-operated electronic devices such as a smartphone, PDA, tablet, laptop computer, GPS, etc. The objects can include personal items such as a purse or wallet, a book, a map, and the like. The objects can include an additional vehicle occupant, where the additional vehicle occupant can include an adult, a child, or a pet. The interaction between the vehicle occupant and one or more objects can be based on a level of interaction. Embodiments include a level of interaction, where the level of interaction is further based on other sensors within the vehicle. The other sensors can include cameras, near-infrared sensors, audio sensors, physio sensors, and the like. Discussed throughout, techniques can be used for calculating a distance between an occupant and the object. The object can be out of reach, out of sight, or within sight of the occupant, etc. Further embodiments include determining if the object is within a reachable distance of the occupant. Other distances or situations between the object and the occupant can be determined. In embodiments, the analyzing includes determining if the object is being held by the occupant.

Objects within the vehicle 410 are shown. In embodiments, the object can be a cell phone. The cell phone can include a smartphone, a PDA, a softphone, and so on. The cell phone can be within reach of the vehicle occupant. The cellphone that is within reach of the vehicle occupant can be held in the hand of the vehicle occupant 430, placed on the lap 432 of the vehicle occupant, etc. A cellphone or tablet 438 may be adjacent to the vehicle occupant, may be located 436 on the dashboard of the vehicle or beyond reach of the vehicle occupant, etc. In embodiments, the object can be a computing device 440 such as a laptop or netbook computing device, a convertible computing device, and the like. In further embodiments, the computing device includes GPS 434 services. The GPS services can include providing a map, travel route directions such as distance and turn by turn directions, proposed travel routes, etc. In embodiments, the computing device can provide business location information. The business location information can include restaurant location and menu information, pharmacy location information, movie theater location and showing schedule information, and the like. Further objects can be located within the vehicle. In embodiments, one or more displays, such as displays 442 and 444, can be present within the vehicle. The displays can be used to provide media presentations, where the media presentations can include news bulletins, sports events, movies, television programs, etc. In other embodiments, an object within the vehicle can include a personal item. The personal item can include a purse, a wallet, or briefcase (not shown), a package 446, and so on. The object within the vehicle can include an animate object such as a child or pet, an additional occupant of the vehicle, etc. The child can be seated in a child seat, a booster seat, a front-facing car seat, a rear-facing car seat, and so on. A rear-facing car seat scenario may preclude direct image detection of the child and may therefore require additional analysis measures such as monitoring images of the immediate area surrounding the rear-facing car seat, monitoring audio input, monitoring thermal profiles, etc. Multiple convolutional neural networks may be required to generate an accurate estimate of a vehicle's cabin interior space. In embodiments, external sensor input can be used to augment the interior image and sensor information, such as marrying visual input with external lidar.

Figure 5:
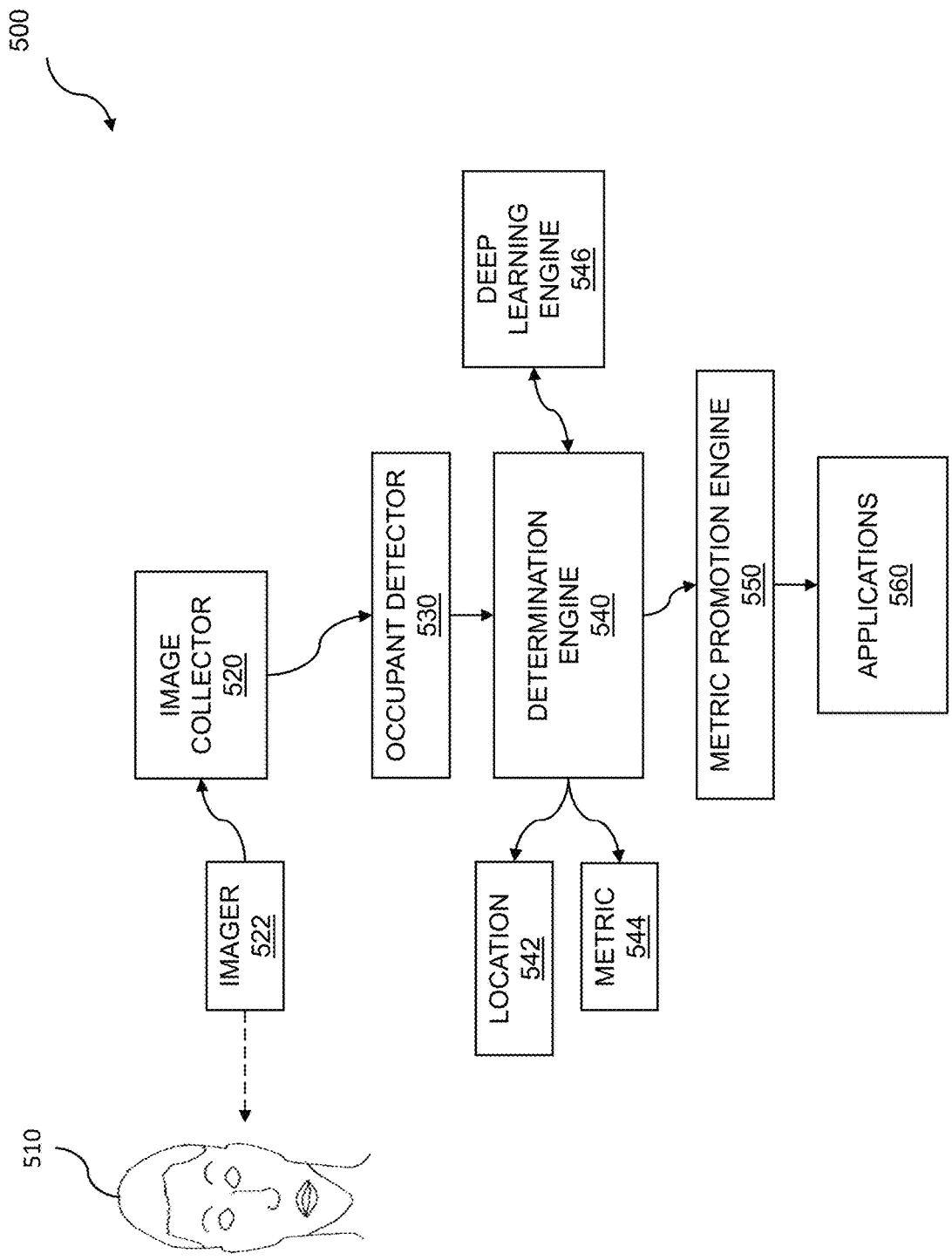
FIG. 5 is a diagram of a human perception artificial intelligence system.

FIG. 5 is a diagram of a human perception artificial intelligence (AI) system. Image processing or deep learning can be used by the system to accomplish human perception AI. Images of a vehicle interior are collected. The images are analyzed to detect an object. The analyzing includes determining occupant location within the vehicle so that a proximity of the object to the occupant can be determined. The proximity can include being within reach of the occupant, being held by the occupant and so on. The object within the vehicle is classified. The object can include a child or a pet, a personal item such as a wallet or purse, a handheld electronic device, etc. A level of interaction between an occupant of the vehicle and the object within the vehicle is estimated. The interaction can include looking at the object, talking to the object, being distracted by the object, and the like. A control element of the vehicle is changed based on the classifying and the level of interaction. The control element can include performing a lock out operation; recommending a break for the occupant; recommending a different route; recommending how far to drive; responding to traffic; responding to weather; adjusting seats, mirrors, climate control, lighting, music, audio stimuli, or interior temperature; brake activation; or steering control.

The system 500 for human perception artificial intelligence can be executed on one or more of a variety of types of processors. In embodiments, the processor can be included a vehicle. The in-vehicle processor can include a built-in processor, server, etc. In other embodiments, the processor can include a processor associated with the vehicle occupant, where the processor associated with the vehicle occupant can include a processor coupled to a personal electronic device such as a smartphone, a tablet, a PDA, and the like. The processor can include a processor located beyond the vehicle such as a server, a remote server, a cloud-based server, a grid server, etc. In embodiments, the system 500 can operate on one or more embedded systems, where the one or more embedded systems can include an automotive embedded system. An automotive embedded system can include a control system for an autonomous or semiautonomous vehicle.

In the system 500, a person 510 can be observed. The person can be an occupant of a vehicle and can be operating or traveling within the vehicle, viewing a video or media presentation, and so on. An image collector 520 can use an imager 522 to collect imaging of the person. The image collector can collect video, still images, and the like. The image collector can use one or more imagers to collect imaging based on differing spectra of light. The differing spectra of light can include visible light, near-infrared (NIR) light, etc. While one person is shown, in embodiments, other numbers of occupants can be within the vehicle. An occupant detector 530 can be used to detect an occupant within the vehicle interior. The occupant detector can detect an occupant based on identifying an upper torso of the occupant. The occupant detector can be used to detect whether there are additional occupants within the vehicle. Further embodiments can include detecting a second occupant within the vehicle interior. More than two occupants can be detected within the vehicle. In embodiments, additional images of the vehicle occupant can be collected. The additional images can be collected at various points in time. In embodiments, the additional images can be collected during a current vehicle journey by the occupant. The additional images can be collected during other vehicle journeys. In embodiments, additional images that can be collected within the vehicle interior can include images that were collected during a previous vehicle journey by the occupant. The additional images can be collected using image collectors beyond the vehicle, where the locations beyond the vehicle can include outside the vehicle. In further embodiments, additional images can be collected from an interior of a second vehicle. The images that are collected need not include the vehicle occupant. Further embodiments can include collecting earlier imaging from the vehicle interior prior to the occupant arriving at the vehicle.

The system can include a determination engine 540. The determination engine can be used to make a variety of determinations regarding one or more vehicle occupants, one or more human perception metrics, and the like. In embodiments, the determination engine can be used for determining a location 542 for the occupant within the vehicle interior. The location of the occupant can include a position within the vehicle such as toward the front of the vehicle, near the middle of the vehicle, toward the rear of the vehicle, to the left within the vehicle, to the right within the vehicle, etc. The determining location can include determining that the vehicle occupant is located at a driver, operator, or controller position; a passenger position; and the like. The determining location can include determining a location for more than one occupant within the vehicle. Further embodiments can include determining seating data for the occupant based on the location for the occupant. The determining engine can be used for determining a location for the second occupant.

The determination engine 540 can be used determine one or more human perception metrics 544. In embodiments, the determination engine can be used for determining a human perception metric for the vehicle occupant based on the imaging. More than one human perception metric can be determined. In embodiments, the human perception metric can include an activity by the occupant. The activity by the occupant can include reading, talking, sleeping, and so on. The human perception metric can include an involvement metric by the occupant. The involvement can include information indicating involvement with a vehicle control. The vehicle control can include climate control, mirror adjustment, entertainment selection, etc. The involvement metric can include information on involvement with an object inside the vehicle. The object within the vehicle can be a personal object such as a smartphone or tablet. The human perception metric can include a cognitive load for the occupant. Cognitive load for a vehicle occupant can refer to expending an amount of energy to perform a task, sorting tasks, creating a store of knowledge, etc. The cognitive load can be related to the cognitive state of the vehicle occupant. In embodiments, the cognitive state can include drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. The human perception metric can include a distractedness, drowsiness, or impairment evaluation for the occupant. The distractedness, drowsiness, or impairment evaluation can be based on orientation of the upper torso of the vehicle occupant such as oriented forward within the vehicle. The distractedness, drowsiness, or impairment evaluation can be based on reaction time, cognitive state, cognitive load, etc. The human perception metric can include vehicle occupant demographics. Various demographic information related to the vehicle occupant can be used. The vehicle occupant demographics can include one or more of age, gender identity, cultural identity, racial identity, geographic location, and so on.

The determining, whether for occupant location, human perception metric, and so on, can be performed using deep learning. The deep learning can be performed by a deep learning engine 546. Deep learning can be based on learning one or more representations related to data, such as location data or human perception data, rather than relying on algorithms that can be specific to a given data analysis task. Data representations, such as those based on feature learning, include techniques for automating the discovery, by a deep learning system, of representations that can be used to classify or detect features in raw data. In embodiments, the learning is performed using a deep neural network. A deep neural network can include an input layer, an output layer, and hidden layers internal to the neural network. A deep learning network can use weights, biases, and layers that can be learned as part of training the deep neural network. A deep neural network can include a feed-forward network, in which data such as training data or raw data can flow from an input layer, through the neural network, to an output layer. In other embodiments, the learning is performed using a convolutional neural network (CNN). A convolutional neural network can include properties such as space invariance, shift invariance, or translation invariance, which are properties that are particularly useful for image analysis. A CNN can require little preprocessing of input data because the CNN can learn filters. The learning the filters can obviate the need to code the filters. The filters can enhance image classification tasks such as upper torso data or upper body data analysis. In further embodiments, the learning is performed using a recurrent neural network. A recurrent neural network (RNN) can include connections between nodes to form a directed graph. The directed graph can be along a sequence. An RNN can exhibit temporal behavior by using storage internal to the RNN to process input data sequences.

The system can include a metric promotion engine 550. The metric promotion engine can be used to promote the one or more human perception metrics that are determined by the determination engine to one or more applications 560. The promotion engine can act as an interface between the determination engine and the applications. The promotion engine can include a software development kit (SDK), an interface or "middleware", and the like. The types of applications to which the metric promotion engine promotes the one or more human perception metrics can include control applications. The control applications can include applications for control of vehicles such as autonomous vehicles, semiautonomous vehicles, and so on. The types of applications to which the metric promotion engine promotes the one or more human perception metrics can include recommendation applications. The recommendation application can include recommendations for travel routes, recommendations to take a break from traveling, etc. The recommendation application can include recommending vehicle content such as video content, audio content, etc.

Figure 6:
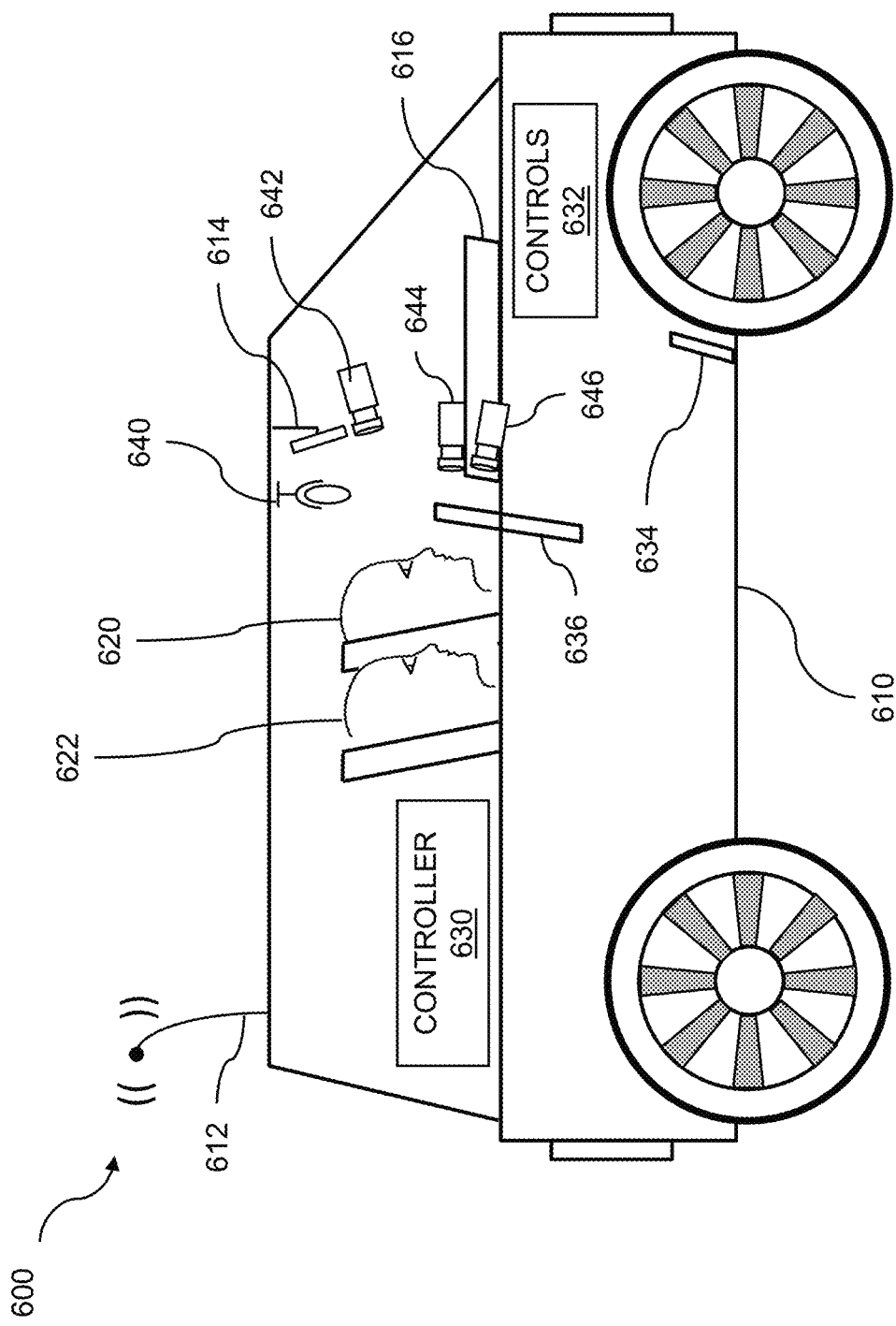
FIG. 6 is a system diagram for an interior of a vehicle.

FIG. 6 is a system diagram for an interior of a vehicle 600. Various control elements of a vehicle can be changed based on interaction between a vehicle occupant and an object within the vehicle. Images of a vehicle interior are collected using imaging devices within the vehicle. The images are analyzed to detect an object, and the object is classified. A level of interaction between an occupant and the object is estimated. A control element of the vehicle is changed based on the classifying and the level of interaction. One or more occupants of a vehicle 610, such as occupants 620 and 622, can be observed by using one or more imagers (not shown), a microphone 640, one or more cameras 642, 644, or 646, and other audio and image capture techniques. The image data can include video data. The video data and the audio data can include cognitive state data, where the cognitive state data can include facial data, voice data, physiological data, and the like. The occupant can be a driver 620 of the vehicle 610, a passenger 622 within the vehicle, a custodial driver of the vehicle (not shown), and so on.

The imaging devices, which can be used to obtain imaging including upper torso data from the occupants of the vehicle 610, can be positioned to capture the upper torso of the vehicle operator, the upper torso of a vehicle passenger, multiple views of the upper torsos of occupants of the vehicle, and so on. The cameras or imaging devices that can be used to obtain images including facial data from the occupants of the vehicle 610 can be positioned to capture the face of the vehicle operator, the face of a vehicle passenger, multiple views of the faces of occupants of the vehicle, and so on. The cameras can be located near a rear-view mirror 614 such as camera 642, can be positioned near or on a dashboard 616 such as camera 644, can be positioned within the dashboard such as camera 646, and so on. The microphone or audio capture device 640 can be positioned within the vehicle such that voice data, speech data, non-speech vocalizations, and so on, can be easily collected with minimal background noise. In embodiments, additional cameras, imaging devices, microphones, audio capture devices, and so on, can be located throughout the vehicle. In further embodiments, each occupant of the vehicle could have multiple cameras, microphones, etc., positioned to capture video data and audio data from that occupant.

The interior of a vehicle 610 can be a traditional vehicle, an autonomous vehicle, a semi-autonomous vehicle, and so on. The vehicle can be a sedan or other automobile, a van, a sport utility vehicle (SUV), a truck, a bus, a special purpose vehicle, and the like. The interior of the vehicle 610 can include standard controls such as a steering wheel 636, a throttle control (not shown), a brake 634, and so on. The interior of the vehicle can include other controls 632 such as controls for seats, mirrors, climate systems, audio systems, etc. The controls 632 of the vehicle 610 can be controlled by a controller 630. The controller 630 can control the vehicle 610 in various manners such as autonomously, semi-autonomously, assertively to a vehicle occupant 620 or 622, etc. In embodiments, the controller provides vehicle control or manipulation techniques, assistance, etc. The controller 630 can receive instructions via an antenna 612 or using other wireless techniques. The controller 630 can be preprogrammed to cause the vehicle to follow a specific route. The specific route that the vehicle is programmed to follow can be based on the cognitive state of the vehicle occupant. The specific route can be chosen based on lowest stress, least traffic, most scenic view, shortest route, and so on.

Figure 7:
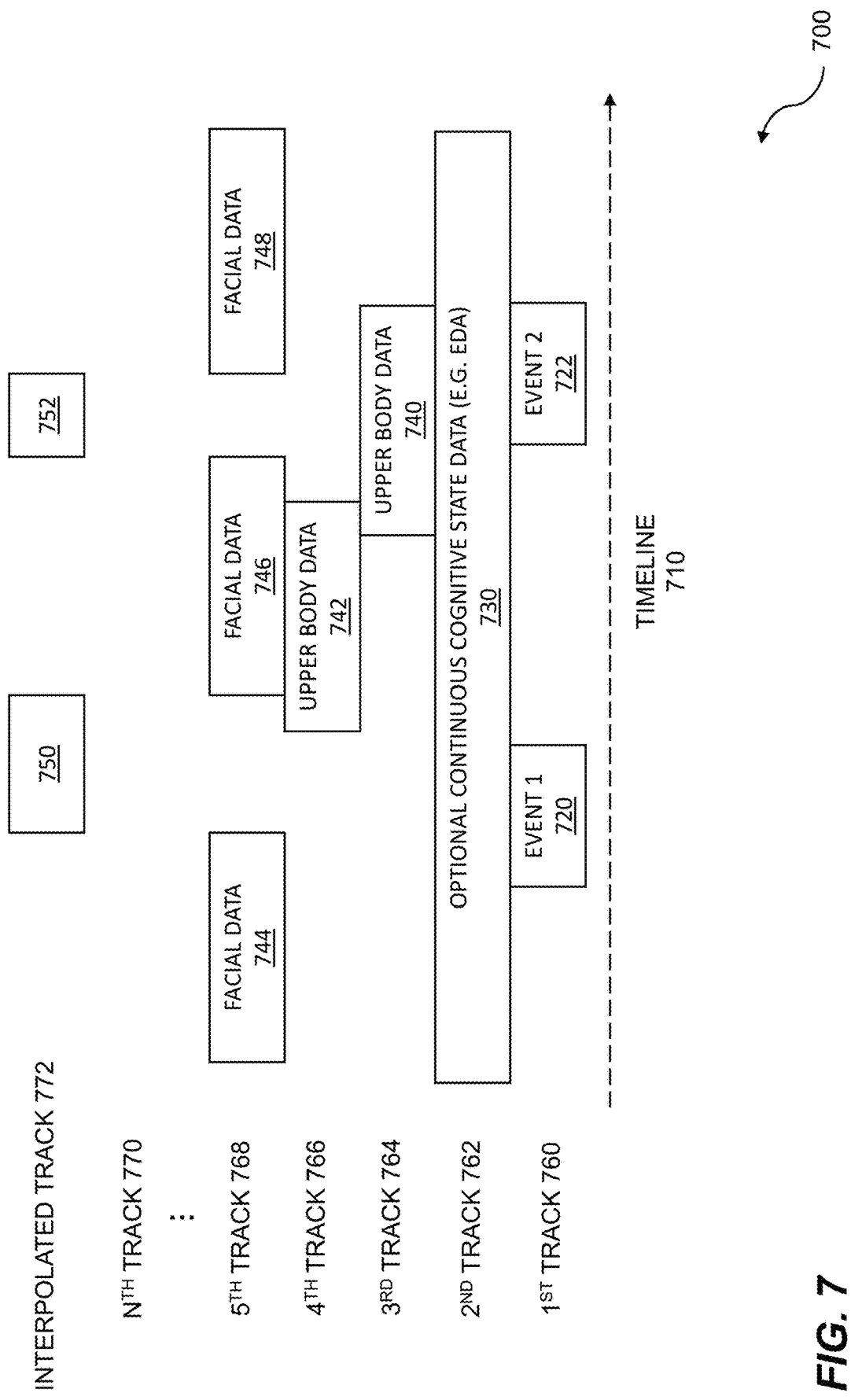
FIG. 7 is a timeline with information tracks relating to cognitive states.

FIG. 7 is a timeline with information tracks relating to cognitive states 700. A timeline can show one or more cognitive states that can be experienced by a vehicle occupant. The vehicle occupant can be an operator of the vehicle, a passenger of the vehicle, a custodial driver of the vehicle, and so on. The timeline can be based on image analysis for vehicle object management. Images of a vehicle interior are collected. The images are analyzed to detect an object within the vehicle, and the object is classified. A level of interaction between an occupant and the object is estimated, and a control element of the vehicle is changed based on the classifying and the level of interaction.

The timeline 710 with information tracks 700 relates to various cognitive states. A first track 760 shows events that, in embodiments, are related to use of a computer by the individual. A first event 720 can indicate an action that the individual took (such as launching an application); an action initiated by the computer (such as the presentation of a dialog box); an external event (such as a new global positioning system (GPS) coordinate); or another event such as receiving an email, a phone call, a text message, or any other type of event. In some embodiments, a photograph can be used to document an event or simply to save contextual information in the first track 760. A second event 722 can indicate another action or event in a similar manner. Such events can be used to provide contextual information and can also include information such as copies of emails, text messages, phone logs, file names, or other information that can prove useful in understanding the context of a user's actions. Thus, in embodiments, contextual information is based on one or more of a photograph, an email, a text message, a phone log, or GPS information.

A second track 762 can include continuously collected cognitive state data such as electrodermal activity data 730. A third track 764 can include upper body data 740. The upper body data, such as upper torso data, can be collected intermittently when the individual is looking toward a camera. The upper body data 740 can include one or more still photographs, videos, or infrared images which can be collected when the user looks in the direction of the camera. A fourth track 766 also can include upper body data that is collected either intermittently or continuously by a second imaging device. The upper body data 742 can include one or more still photographs, videos, infrared images, or abstracted caricatures which can be collected when the user looks in the direction of that camera. A fifth track 768 can include facial data that is collected from a third camera, such as the webcam. In the example shown, the fifth track 768 includes first facial data 744, second facial data 746, and third facial data 748, which can be any type of facial data including data that can be used for determining cognitive state information. Any number of samples of facial data can be collected in any track. The cognitive state data from the various tracks can be collected simultaneously, collected on one track exclusive of other tracks, collected where cognitive state data overlaps between the tracks, and so on. When cognitive state data from multiple tracks overlap, one track's data can take precedence over another track or the data from the multiple tracks can be combined.

Additional tracks, through the n$^{th}$ track 770, of cognitive state data of any type can be collected. The additional tracks 770 can be collected on a continuous or on an intermittent basis. The intermittent basis can be either occasional or periodic. Analysis can further comprise interpolating cognitive state data when the cognitive state data collected is intermittent, and/or imputing additional cognitive state data where the cognitive state data is missing. One or more interpolated tracks 772 can be included and can be associated with cognitive state data that is collected on an intermittent basis, such as the facial data of the fifth track 768. Interpolated data 750 and further interpolated data 752 can contain interpolations of the facial data of the fifth track 768 for the time periods where no facial data was collected in that track. Other embodiments interpolate data for periods where no track includes facial data. In other embodiments, analysis includes interpolating cognitive state analysis when the cognitive state data collected is intermittent.

The cognitive state data, such as the continuous cognitive state data 730 and/or any of the collected upper body data 740 and 742, and/or facial data 744, 746, and 748, can be tagged. The tags can include metadata related to the cognitive state data, including, but not limited to, the device that collected the cognitive state data; the individual from whom the cognitive state data was collected; the task being performed by the individual; the media being viewed by the individual; and the location, environ-cognitive conditions, time, date, or any other contextual information. The tags can be used to locate pertinent cognitive state data; for example, the tags can be used to retrieve the cognitive state data from a database. The tags can be included with the cognitive state data that is sent over the internet to cloud or web-based storage and/or services. As such, the tags can be used locally on the machine where the cognitive state data was collected and/or remotely on a remote server or a cloud/web service.

Other tags can be related to the cognitive state data, which is data related to, attached to, indicative of, including, containing, etc., the cognitive state. Further embodiments can include tagging the cognitive state data with sensor data. The sensor data can be obtained from the vehicle occupant along with the video data or the audio data, instead of the video data or the audio data, etc. In embodiments, the sensor data can include one or more of vehicle temperature, outside temperature, time of day, level of daylight, weather conditions, headlight activation, windshield wiper activation, entertainment center selection, or entertainment center volume. Other sensor data can include physiological data related to one or more occupants of the vehicle. The physiological data can include heart rate, heart rate variability, electrodermal activity, acceleration, and the like. The tags can also be related to the cognitive state that can be determined by image-based analysis of the video, audio, or physiological data, or other techniques. In embodiments, the tags that can be applied can be based on one or more of drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

Figure 8:
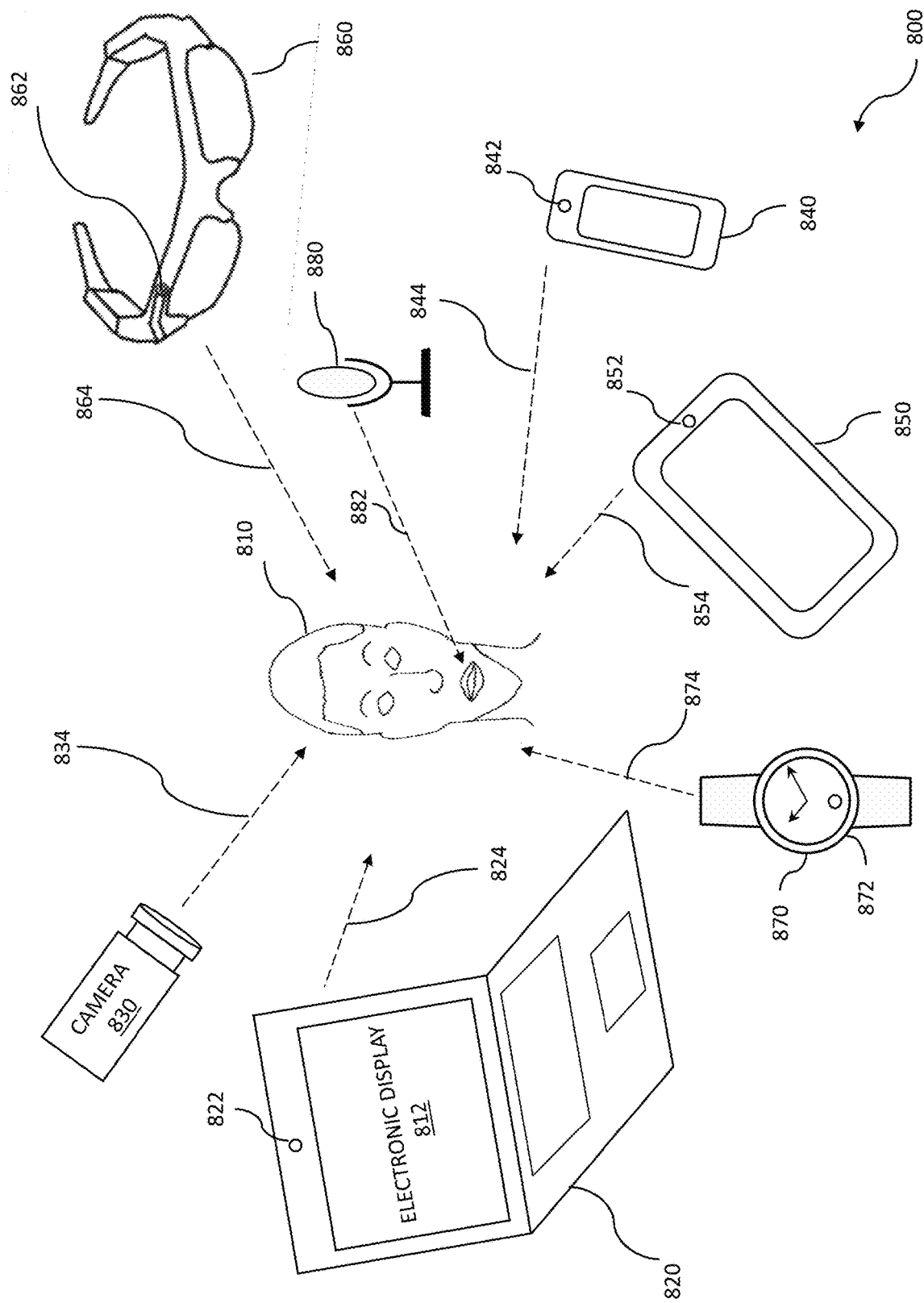
FIG. 8 shows example image and audio collection including multiple mobile devices.

FIG. 8 shows example image and audio collection including multiple mobile devices. Imaging, which can include image data, facial or torso data, cognitive state data, audio data, and physiological data, can be collected using multiple mobile devices. The imaging data can be applied to image analysis for vehicle object management. Images of a vehicle interior are collected, and the images are analyzed to detect an object within the vehicle. Detection of the object can be based on object shape or size, object location, and so on. The object is classified, where the classifying can determine a type of object such as a child or a pet, an electronic device, a personal item, etc. A level of interaction is estimated between a vehicle occupant and the object. A vehicle control element is changed based on the classifying and the level of interaction. The changing of the control element includes performing a lock out operation; recommending a break for the occupant; recommending a different route; recommending how far to drive; responding to traffic; responding to weather; adjusting seats, mirrors, climate control, lighting, music, audio stimuli, or interior temperature; brake activation; or steering control.

A location within the vehicle interior is determined for the occupant, and a human perception metric is determined. Audio information can be obtained and can be used for augmenting the determining. The human perception metric is promoted to a using application. In the diagram 800, the multiple mobile devices can be used separately or in combination to collect video data, audio data, physiological data, or some or all of video data, audio data, and physiological data, on a user 810. While one person is shown, the imaging, video data, audio data, or physiological data can be collected on multiple people. A user 810 can be observed as she or he is performing a task, experiencing an event, viewing a media presentation, and so on. The user 810 can be shown one or more media presentations, political presentations, social media, or another form of displayed media. The one or more media presentations can be shown to a plurality of people. The media presentations can be displayed on an electronic display 812 or another display. The data collected on the user 810 or on a plurality of users can be in the form of one or more videos, video frames, and still images; one or more audio channels, etc. The plurality of video data and audio data can be of people who are experiencing different situations. Some example situations can include the user or plurality of users being exposed to TV programs, movies, video clips, social media, and other such media. The situations could also include exposure to media such as advertisements, political messages, news programs, and so on.

As noted before, video data and audio data can be collected on one or more users in substantially identical or different situations while viewing either a single media presentation or a plurality of presentations. The data collected on the user 810 can be analyzed and viewed for a variety of purposes including expression analysis, cognitive state analysis, mental state analysis, emotional state analysis, and so on. The electronic display 812 can be on a laptop computer 820 as shown, a tablet computer 850, a cell phone 840, a television, a mobile monitor, or any other type of electronic device. In one embodiment, video data including expression data is collected on a mobile device such as a cell phone 840, a tablet computer 850, a laptop computer 820, or a watch 870. Similarly, the audio data including speech data and non-speech vocalizations can be collected on one or more of the mobile devices. Thus, the multiple sources can include at least one mobile device, such as a phone 840 or a tablet 850, or a wearable device such as a watch 870 or glasses 860. A mobile device can include a front-side camera and/or a back-side camera that can be used to collect expression data. A mobile device can include a microphone, audio transducer, or other audio capture apparatus that can be used to capture the speech and non-speech vocalizations. Sources of expression data can include a webcam 822, a phone camera 842, a tablet camera 852, a wearable camera 862, and a mobile camera 830. A wearable camera can comprise various camera devices, such as a watch camera 872. Sources of audio data 882 can include a microphone 880.

As the user 810 is monitored, the user might move due to the nature of the task, boredom, discomfort, distractions, or for another reason. As the user moves, the camera with a view of the user's face can be changed. Thus, as an example, if the user is looking in a first direction, the line of sight 824 from the webcam 822 is able to observe the user's face, but if the user is looking in a second direction, the line of sight 834 from the mobile camera 830 is able to observe the user's face. Furthermore, in other embodiments, if the user is looking in a third direction, the line of sight 844 from the phone camera 842 is able to observe the user's face, and if the user is looking in a fourth direction, the line of sight 854 from the tablet camera 852 is able to observe the user's face. If the user is looking in a fifth direction, the line of sight 864 from the wearable camera 862, which can be a device such as the glasses 860 shown which can be worn by another user or an observer, is able to observe the user's face. If the user is looking in a sixth direction, the line of sight 874 from the wearable watch-type device 870, with a camera 872 included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 810 can also use a wearable device including a camera for gathering contextual information and/or collecting expression data on other users. Because the user 810 can move her or his head, the facial data can be collected intermittently when she or he is looking in a direction of a camera. In some cases, multiple people can be included in the view from one or more cameras, and some embodiments include filtering out faces of one or more other people to determine whether the user 810 is looking toward a camera. All or some of the expression data can be continuously or sporadically available from the various devices and other devices.

The captured video data can include facial expressions and can be analyzed on a computing device such as the video capture device or on another separate device. The analysis can take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capturing device.

Figure 9:
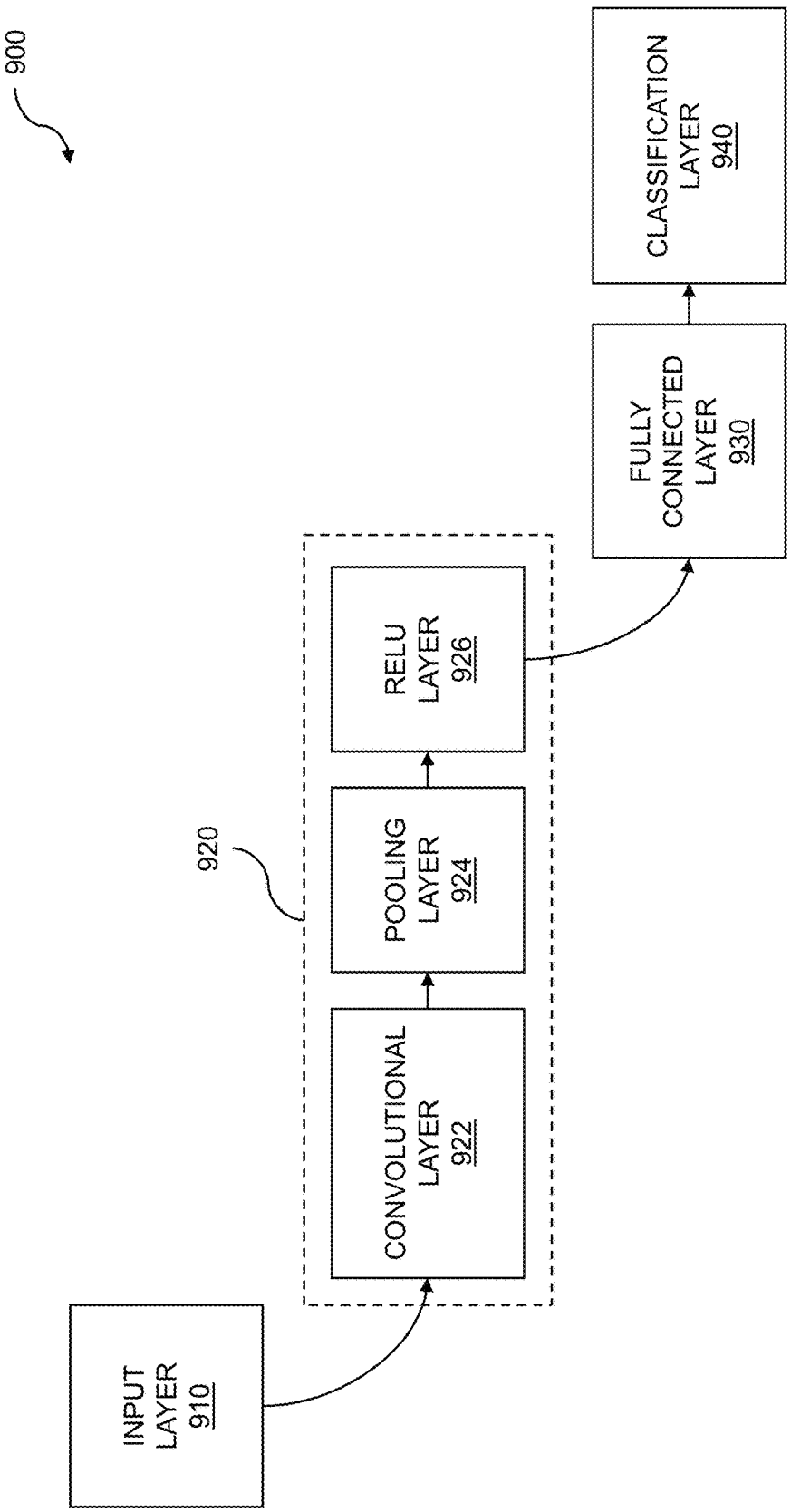
FIG. 9 is an example showing a convolutional neural network (CNN).

FIG. 9 is an example showing a convolutional neural network (CNN). A convolutional neural network, such as network 900, can be used for various applications. The applications for which the CNN can be used can include deep learning, where the deep learning can be applied to vehicle interior object management. Various control elements of a vehicle can be changed based on interaction between a vehicle occupant and an object within the vehicle. Images of a vehicle interior are collected. The images can be collected using imaging devices, where a variety of imaging devices can be used. Other data such as audio data or physiological data can also be collected. The images are analyzed to detect an object within the vehicle, and the object is classified. The classifying of the object can determine the type of object, the location of the object, the proximity of the object to the occupant, and so on. A level of interaction between an occupant and the object is estimated. The interaction can be tactile, voice based, etc. The interaction can be based on human perception AI or cognitive load. A control element of the vehicle is changed based on the classifying and the level of interaction. A control element can include vehicle climate control or audio selection, adjusting to traffic or weather, proposing an alternative route, and the like. The convolutional neural network can be applied to analysis tasks such as image analysis, cognitive state analysis, mental state analysis, mood analysis, emotional state analysis, and so on. The CNN can be applied to various tasks such as autonomous vehicle or semiautonomous vehicle manipulation, vehicle content recommendation, and the like. When the imaging and other data collected includes cognitive state data, the cognitive state data can include mental processes, where the mental processes can include attention, creativity, memory, perception, problem solving, thinking, use of language, or the like.

Analysis, including cognitive analysis, is a very complex task. Understanding and evaluating moods, emotions, mental states, or cognitive states, requires a nuanced evaluation of facial expressions or other cues generated by people. Cognitive state analysis is important in many areas such as research, psychology, business, intelligence, law enforcement, and so on. The understanding of cognitive states can be useful for a variety of business purposes, such as improving marketing analysis, assessing the effectiveness of customer service interactions and retail experiences, and evaluating the consumption of content such as movies and videos. Identifying points of frustration in a customer transaction can allow a company to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal. Thus, by analyzing facial expressions en masse in real time, important information regarding the general cognitive state of the audience can be obtained.

Analysis of facial expressions is also a complex task. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, cognitive states, physiological data, and so on. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including physiological data can be collected, where the physiological data can be obtained using a camera or other image capture device, without contacting the person or persons. Respiration, heart rate, heart rate variability, perspiration, temperature, and other physiological indicators of cognitive state can be determined by analyzing the images and video data.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying cognitive states, moods, mental states, emotional states, and so on, from the facial expressions of the faces that are identified. Audio data applications can include analyzing audio such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more cognitive states, moods, mental states, emotional states, etc.

The artificial neural network, such as a convolutional neural network which forms the basis for deep learning, is based on layers. The layers can include an input layer, a convolutional layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolutional layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of the cognitive states of faces within the images that are provided to the input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to the next layer. Weights adjust the output of one layer as it is fed to the next layer. When the final layer is reached, the output of the final layer can be a facial expression, a cognitive state, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning weights can be accomplished during a feed-forward pass through the multilayered neural network. In a feed-forward arrangement, the information moves forward from the input nodes, through the hidden nodes, and on to the output nodes. Additionally, the weights can be updated during a backpropagation process through the multilayered analysis engine.

Returning to the figure, FIG. 9 is an example showing a convolutional neural network 900. The convolutional neural network can be used for deep learning, where the deep learning can be applied to image analysis for human perception artificial intelligence. The deep learning system can be accomplished using a variety of networks. In embodiments, the deep learning can be performed using a convolution neural network. Other types of networks or neural networks can also be used. In other embodiments, the deep learning can be performed using a recurrent neural network. The deep learning can accomplish upper torso identification, facial recognition, analysis tasks, etc. The network includes an input layer 910. The input layer 910 receives image data. The image data can be input in a variety of formats, such as JPEG, TIFF, BMP, and GIF. Compressed image formats can be decompressed into arrays of pixels, wherein each pixel can include an RGB tuple. The input layer 910 can then perform processing such as identifying boundaries of the face, identifying landmarks of the face, extracting features of the face, and/or rotating a face within the plurality of images.

The network includes a collection of intermediate layers 920. The multilayered analysis engine can include a convolutional neural network. Thus, the intermediate layers can include a convolutional layer 922. The convolutional layer 922 can include multiple sublayers, including hidden layers within it. The output of the convolutional layer 922 feeds into a pooling layer 924. The pooling layer 924 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 95-percent of the downstream node activations. The multilayered analysis engine can further include a max pooling layer 924. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (RELU) layer 926. The output of the pooling layer 924 can be input to the RELU layer 926. In embodiments, the RELU layer implements an activation function such as $f(x)=\max(0,x)$, thus providing an activation with a threshold at zero. In some embodiments, the RELU layer 926 is a leaky RELU layer. In this case, instead of the activation function providing zero when x<0, a small negative slope is used, resulting in an activation function such as $f(x)=1(x<0)(\alpha x)+1(x>=0)(x)$. This can reduce the risk of "dying RELU" syndrome, where portions of the network can be "dead" with nodes/neurons that do not activate across the training dataset. The image analysis can comprise training a multilayered analysis engine using the plurality of images, wherein the multilayered analysis engine can include multiple layers that include one or more convolutional layers 922 and one or more hidden layers, and wherein the multilayered analysis engine can be used for emotional analysis.

The example 900 includes a fully connected layer 930. The fully connected layer 930 processes each pixel/data point from the output of the collection of intermediate layers 920. The fully connected layer 930 takes all neurons in the previous layer and connects them to every single neuron it has. The output of the fully connected layer 930 provides input to a classification layer 940. The output of the classification layer 940 provides a facial expression and/or cognitive state as its output. Thus, a multilayered analysis engine such as the one depicted in FIG. 9 processes image data using weights, models the way the human visual cortex performs object recognition and learning, and effectively analyzes image data to infer facial expressions and cognitive states.

Machine learning for generating parameters, analyzing data such as facial data and audio data, and so on, can be based on a variety of computational techniques. Generally, machine learning can be used for constructing algorithms and models. The constructed algorithms, when executed, can be used to make a range of predictions relating to data. The predictions can include whether an object in an image is a face, a box, or a puppy; whether a voice is female, male, or robotic; whether a message is legitimate email or a "spam" message; and so on. The data can include unstructured data and can be of large quantity. The algorithms that can be generated by machine learning techniques are particularly useful to data analysis because the instructions that comprise the data analysis technique do not need to be static. Instead, the machine learning algorithm or model, generated by the machine learning technique, can adapt. Adaptation of the learning algorithm can be based on a range of criteria such as success rate, failure rate, and so on. A successful algorithm is one that can adapt—or learn—as more data is presented to the algorithm. Initially, an algorithm can be "trained" by presenting it with a set of known data (supervised learning). Another approach, called unsupervised learning, can be used to identify trends and patterns within data. Unsupervised learning is not trained using known data prior to data analysis.

Reinforced learning is an approach to machine learning that is inspired by behaviorist psychology. The underlying premise of reinforced learning (also called reinforcement learning) is that software agents can take actions in an environment. The actions that are taken by the agents should maximize a goal such as a "cumulative reward". A software agent is a computer program that acts on behalf of a user or other program. The software agent is implied to have the authority to act on behalf of the user or program. The actions taken are decided by action selection to determine what to do next. In machine learning, the environment in which the agents act can be formulated as a Markov decision process (MDP). The MDPs provide a mathematical framework for modeling of decision making in environments where the outcomes can be partly random (stochastic) and partly under the control of the decision maker. Dynamic programming techniques can be used for reinforced learning algorithms. Reinforced learning is different from supervised learning in that correct input/output pairs are not presented, and suboptimal actions are not explicitly corrected. Rather, on-line or computational performance is the focus. On-line performance includes finding a balance between exploration of new (uncharted) territory or spaces and exploitation of current knowledge. That is, there is a tradeoff between exploration and exploitation.

Machine learning based on reinforced learning adjusts or learns based on learning an action, a combination of actions, and so on. An outcome results from taking an action. Thus, the learning model, algorithm, etc., learns from the outcomes that result from taking the action or combination of actions. The reinforced learning can include identifying positive outcomes, where the positive outcomes are used to adjust the learning models, algorithms, and so on. A positive outcome can be dependent on a context. When the outcome is based on a mood, emotional state, mental state, cognitive state, etc., of an individual, then a positive mood, emotion, mental state, or cognitive state can be used to adjust the model and the algorithm. Positive outcomes can include the person being more engaged, where engagement is based on affect, the person spending more time playing an online game or navigating a webpage, the person converting by buying a product or service, and so on. The reinforced learning can be based on exploring a solution space and adapting the model, algorithm, etc., which stem from outcomes of the exploration. When positive outcomes are encountered, the positive outcomes can be reinforced by changing weighting values within the model, algorithm, etc. Positive outcomes may result in increased weighting values. Negative outcomes can also be considered, where weighting values may be reduced or otherwise adjusted.

Figure 10:
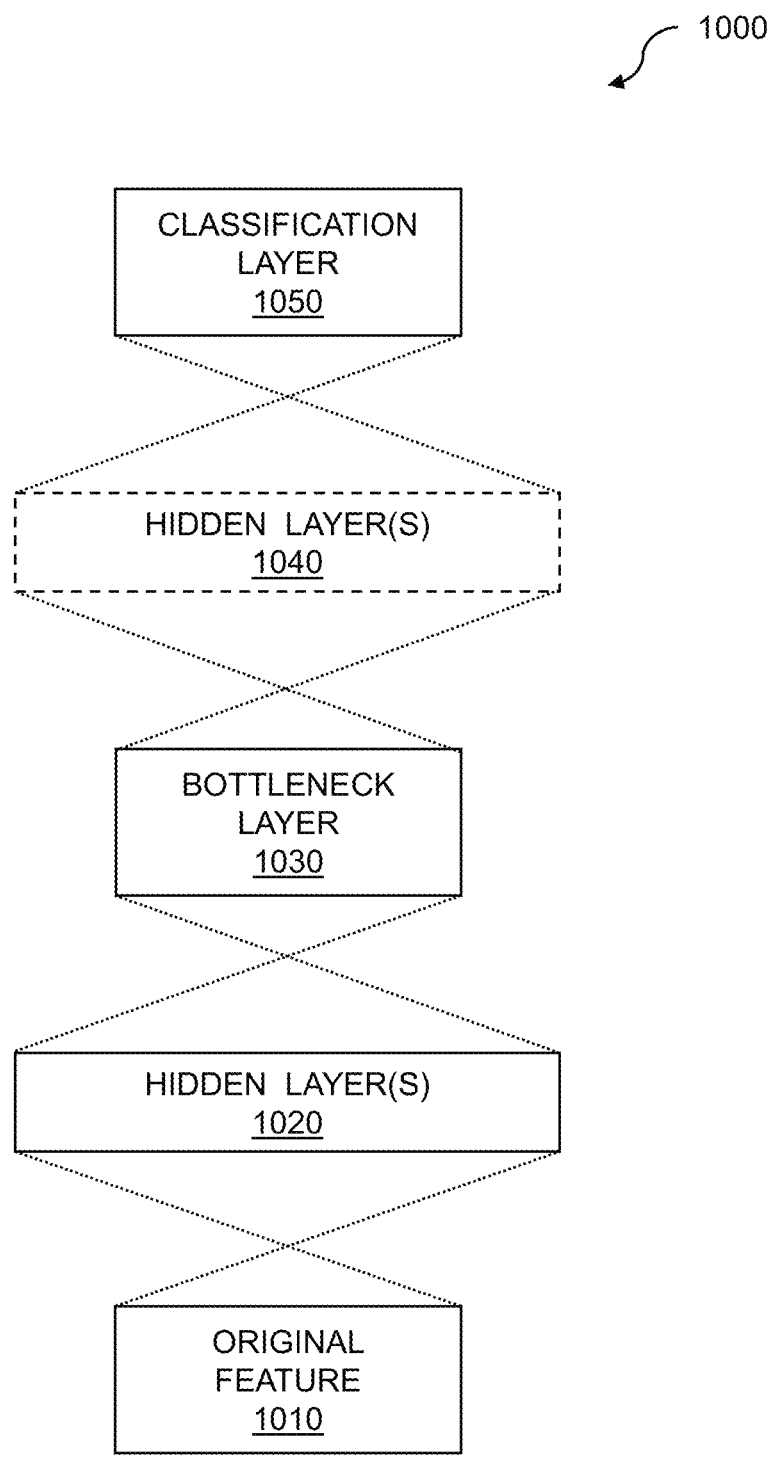
FIG. 10 illustrates a bottleneck layer within a deep learning environment.

FIG. 10 illustrates a bottleneck layer within a deep learning environment. A deep learning environment can be based on a neural network such as a deep neural network. The deep neural network comprises a plurality of layers such as input layers, output layers, convolutional layers, activation layers, and so on. The plurality of layers in a deep neural network (DNN) can include a bottleneck layer. The bottleneck layer can be used for image analysis for vehicle object management. A deep neural network can apply classifiers such as object classifiers, image classifiers, facial classifiers, audio classifiers, speech classifiers, physiological classifiers, and so on. The classifiers can be learned by analyzing training data. The classifiers can be used for vehicle interior object management. Various control elements of a vehicle can be changed based on interaction between a vehicle occupant and an object within the vehicle. Images of a vehicle interior are collected. The images are analyzed to detect an object within the vehicle, and the object is classified. A level of interaction between a vehicle occupant and the object is estimated. A vehicle control element is changed based on the classifying and the level of interaction.

Layers of a deep neural network can include a bottleneck layer 1000. A bottleneck layer can be used for a variety of applications such as identification of an upper torso, facial recognition, voice recognition, emotional state recognition, and so on. The deep neural network in which the bottleneck layer is located can include a plurality of layers. The plurality of layers can include an original feature layer 1010. A feature such as an image feature can include points, edges, objects, boundaries between and among regions, properties, and so on. The deep neural network can include one or more hidden layers 1020. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to a different emotional face or voice. In some cases, an individual bottleneck layer can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1030. The bottleneck layer can include a fewer number of nodes than the one or more preceding hidden layers. The bottleneck layer can create a constriction in the deep neural network or other network. The bottleneck layer can force information that is pertinent to a classification, for example, into a low dimensional representation. The bottleneck features can be extracted using an unsupervised technique. In other embodiments, the bottleneck features can be extracted using a supervised technique. The supervised technique can include training the deep neural network with a known dataset. The features can be extracted from an autoencoder such as a variational autoencoder, a generative autoencoder, and so on. The deep neural network can include hidden layers 1040. The number of the hidden layers can include zero hidden layers, one hidden layer, a plurality of hidden layers, and so on. The hidden layers following the bottleneck layer can include more nodes than the bottleneck layer. The deep neural network can include a classification layer 1050. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 11:
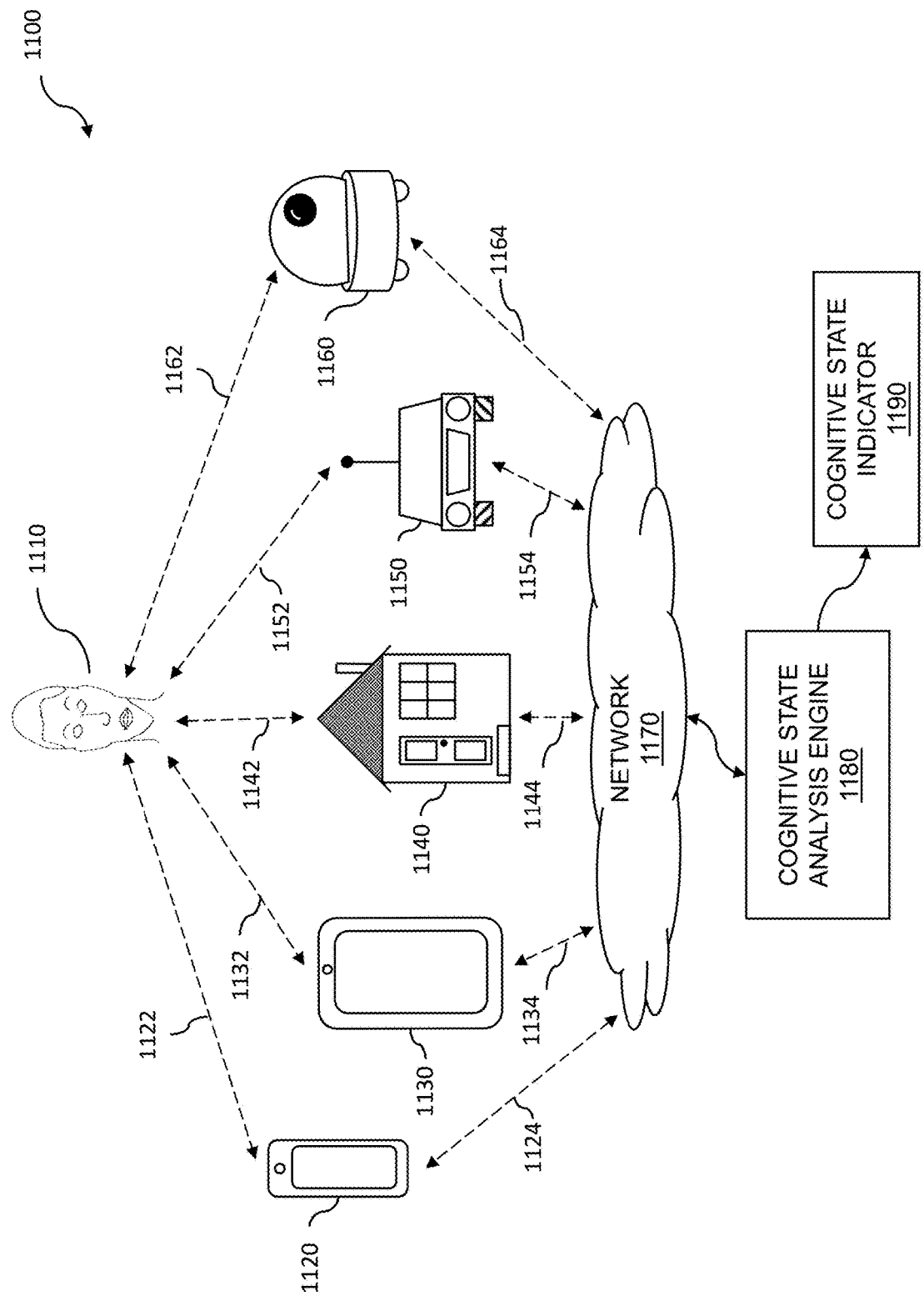
FIG. 11 shows data collection including devices and locations.

FIG. 11 shows data collection including devices and locations 1100. Data, including imaging, video data, audio data, and physio data can be obtained for vehicle interior object management. Various control elements of a vehicle can be changed based on interaction between a vehicle occupant and an object within the vehicle. Imaging, audio, physio, and other data can be obtained from multiple devices, vehicles, and locations. Images of a vehicle interior are collected. The imaging can include visible light-based images and near-infrared based images. An object within the vehicle is detected by analyzing the images. The object within the vehicle is classified. A level of interaction between an occupant of the vehicle and the object within the vehicle is estimated. A control element is changed based on the classifying and the level of interaction.

The multiple mobile devices, vehicles, and locations 1100 can be used separately or in combination to collect imaging, video data, audio data, physio data, etc., on a user 1110. The imaging can include video data, where the video data can include upper torso data. Other data such as audio data, physiological data, and so on, can be collected on the user. While one person is shown, the video data, or other data, can be collected on multiple people. A user 1110 can be observed as she or he is performing a task, experiencing an event, viewing a media presentation, and so on. The user 1110 can be shown one or more media presentations, political presentations, social media, or another form of displayed media. The one or more media presentations can be shown to a plurality of people. The media presentations can be displayed on an electronic display coupled to a client device. The data collected on the user 1110 or on a plurality of users can be in the form of one or more videos, video frames, still images, etc. The plurality of videos can be of people who are experiencing different situations. Some example situations can include the user or plurality of users being exposed to TV programs, movies, video clips, social media, social sharing, and other such media. The situations could also include exposure to media such as advertisements, political messages, news programs, and so on. As noted before, video data can be collected on one or more users in substantially identical or different situations and viewing either a single media presentation or a plurality of presentations. The data collected on the user 1110 can be analyzed and viewed for a variety of purposes including body position or body language analysis, expression analysis, mental state analysis, cognitive state analysis, and so on. The electronic display can be on a smartphone 1120 as shown, a tablet computer 1130, a personal digital assistant, a television, a mobile monitor, or any other type of electronic device. In one embodiment, expression data is collected on a mobile device such as a cell phone 1120, a tablet computer 1130, a laptop computer, or a watch. Thus, the multiple sources can include at least one mobile device, such as a phone 1120 or a tablet 1130, or a wearable device such as a watch or glasses (not shown). A mobile device can include a front-facing camera and/or a back-facing camera that can be used to collect expression data. Sources of expression data can include a webcam, a phone camera, a tablet camera, a wearable camera, and a mobile camera. A wearable camera can comprise various camera devices, such as a watch camera. In addition to using client devices for data collection from the user 1110, data can be collected in a house 1140 using a web camera or the like; in a vehicle 1150 using a web camera, client device, etc.; by a social robot 1160, and so on.

As the user 1110 is monitored, the user 1110 might move due to the nature of the task, boredom, discomfort, distractions, or for another reason. As the user moves, the camera with a view of the user's face can be changed. Thus, as an example, if the user 1110 is looking in a first direction, the line of sight 1122 from the smartphone 1120 is able to observe the user's face, but if the user is looking in a second direction, the line of sight 1132 from the tablet 1130 is able to observe the user's face. Furthermore, in other embodiments, if the user is looking in a third direction, the line of sight 1142 from a camera in the house 1140 is able to observe the user's face, and if the user is looking in a fourth direction, the line of sight 1152 from the camera in the vehicle 1150 is able to observe the user's face. If the user is looking in a fifth direction, the line of sight 1162 from the social robot 1160 is able to observe the user's face. If the user is looking in a sixth direction, a line of sight from a wearable watch-type device, with a camera included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 1110 can also use a wearable device including a camera for gathering contextual information and/or collecting expression data on other users. Because the user 1110 can move her or his head, the facial data can be collected intermittently when she or he is looking in a direction of a camera. In some cases, multiple people can be included in the view from one or more cameras, and some embodiments include filtering out faces of one or more other people to determine whether the user 1110 is looking toward a camera. All or some of the expression data can be continuously or sporadically available from the various devices and other devices.

The captured video data can include cognitive content, such as facial expressions, etc., and can be transferred over a network 1170. The network can include the Internet or other computer network. The smartphone 1120 can share video using a link 1124, the tablet 1130 using a link 1134, the house 1140 using a link 1144, the vehicle 1150 using a link 1154, and the social robot 1160 using a link 1164. The links 1124, 1134, 1144, 1154, and 1164 can be wired, wireless, and hybrid links. The captured video data, including facial expressions, can be analyzed on a cognitive state analysis engine 1180, on a computing device such as the video capture device, or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device different from the capture device. The analysis data from the cognitive state analysis engine can be processed by a cognitive state indicator 1190. The cognitive state indicator 1190 can indicate cognitive states, mental states, moods, emotions, etc. In embodiments, the cognitive state can include drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

Figure 12:
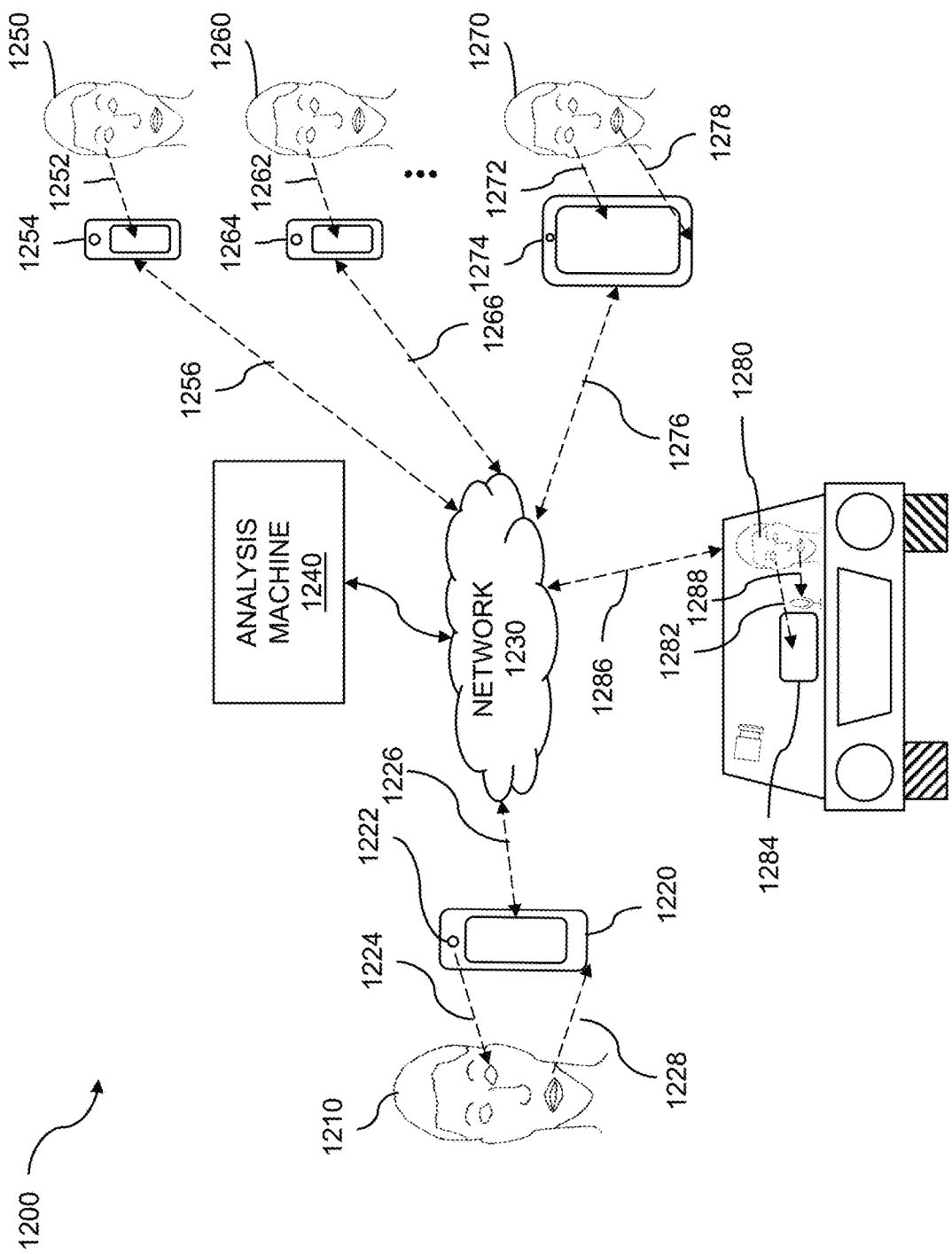
FIG. 12 illustrates an example of live streaming of social video and audio.

FIG. 12 shows an example of live streaming of social video and audio. The streaming of social video and social audio can be applied to vehicle interior object management. The live streaming can include human perception data, imaging data, upper torso data, speech data, audio data, physio data, etc. Various control elements of a vehicle can be changed based on interaction between a vehicle occupant and an object within the vehicle. Images of a vehicle interior are collected. The images are analyzed to detect an object, and the object is classified. A level is estimated of interaction between the object and an occupant of the vehicle. A control element of the vehicle is changed based on the classifying and the level of interaction.

The live streaming and image analysis 1200 can be facilitated by a video capture device, a local server, a remote server, semiconductor-based logic, and so on. The streaming can be live streaming and can include cognitive state analysis, cognitive state event signature analysis, etc. Live streaming video is an example of one-to-many social media, where video can be sent over the Internet from one person to a plurality of people using a social media app and/or platform. Live streaming is one of numerous popular techniques used by people who want to disseminate ideas, send information, provide entertainment, share experiences, and so on. Some of the live streams, such as webcasts, online classes, sporting events, news, computer gaming, or video conferences can be scheduled, while others can be impromptu streams that are broadcast as needed or when desired. Examples of impromptu live stream videos can range from individuals simply wanting to share experiences with their social media followers, to live coverage of breaking news, emergencies, or natural disasters. The latter coverage is known as mobile journalism, or "mojo", and is becoming increasingly common. With this type of coverage, news reporters can use networked, portable electronic devices to provide mobile journalism content to a plurality of social media followers. Such reporters can be quickly and inexpensively deployed as the need or desire arises.

Several live streaming social media apps and platforms can be used for transmitting video. One such video social media app is Meerkat™ which can link with a user's Twitter™ account. Meerkat™ enables a user to stream video using a handheld, networked electronic device coupled to video capabilities. Viewers of the live stream can comment on the stream using tweets that can be seen and responded to by the broadcaster. Another popular app is Periscope™ which can transmit a live recording from one user to his or her Periscope™ account and to other followers. The Periscope™ app can be executed on a mobile device. The user's Periscope™ followers can receive an alert whenever that user begins a video transmission. Another live-stream video platform is Twitch™ which can be used for video streaming of video gaming and broadcasts of various competitions and events.

The example 1200 shows a user 1210 broadcasting a video live stream and an audio live stream to one or more people as shown by a first person 1250, a second person 1260, and a third person 1270. A portable, network-enabled, electronic device 1220 can be coupled to a front-facing camera 1222. The portable electronic device 1220 can be a smartphone, a PDA, a tablet, a laptop computer, and so on. The camera 1222 coupled to the device 1220 can have a line-of-sight view 1224 to the user 1210 and can capture video of the user 1210. The portable electronic device 1220 can be coupled to a microphone (not shown). The microphone can capture voice data 1228 such as speech and non-speech vocalizations. In embodiments, non-speech vocalizations can include grunts, yelps, squeals, snoring, sighs, laughter, filled pauses, unfilled pauses, yawns, or the like. The captured video and audio can be sent to an analysis or recommendation engine 1240 using a network link 1226 to the network 1230. The network link can be a wireless link, a wired link, and so on. The recommendation engine 1240 can recommend to the user 1210 an app and/or platform that can be supported by the server and can be used to provide a video live stream, an audio live stream, or both a video live stream and an audio live stream to one or more followers of the user 1210.

In the example 1200, the user 1210 has four followers: a first person 1250, a second person 1260, a third person 1270, and a fourth person 1280. Each follower has a line-of-sight view to a video screen on a portable, networked electronic device. In other embodiments, one or more followers follow the user 1210 using any other networked electronic device, including a computer. In the example 1200, a first person 1250 has a line-of-sight view 1252 to the video screen of a device 1254; a second person 1260 has a line-of-sight view 1262 to the video screen of a device 1264, a third person 1270 has a line-of-sight view 1272 to the video screen of a device 1274, and a fourth person 1280 has a line-of-sight view 1282 to the video screen of a device 1284. The device 1274 can also capture audio data 1278 from the third person 1270, and the device 1284 can further capture audio data 1288 from the fourth person 1280. The portable electronic devices 1254, 1264, 1274, and 1284 can each be a smartphone, a PDA, a tablet, and so on. Each portable device can receive the video stream and the audio stream being broadcast by the user 1210 through the network 1230 using the app and/or platform that can be recommended by the recommendation engine 1240. The network can include the Internet, a computer network, a cellular network, and the like. The device 1254 can receive a video stream and the audio stream using the network link 1256, the device 1264 can receive a video stream and the audio stream using the network link 1266, the device 1274 can receive a video stream and the audio stream using the network link 1276, the device 1284 can receive a video stream and the audio stream using the network link 1286, and so on. The network link can be a wireless link, a wired link, a hybrid link, and the like. Depending on the app and/or platform that can be recommended by the analysis engine 1240, one or more followers, such as the followers shown 1250, 1260, 1270, and 1280, can reply to, comment on, or otherwise provide feedback to the user 1210 using their respective devices 1254, 1264, 1274, and 1284.

The human face provides a powerful communications medium through its ability to exhibit numerous expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters can be determined, including affect valence, spontaneous reactions, facial action units, and so on. The parameters that are determined can be used to infer or predict emotional, mental, and cognitive states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt-in" to the facial data collection. For example, the person can agree to the capture of facial data using a personal device such as a mobile device or another electronic device by selecting an opt-in choice. Opting-in can then turn on the person's webcam-enabled device and can begin the capture of the person's facial data via a video feed from the webcam or other camera. The video data that is collected can include one or more persons experiencing an event. The one or more persons can be sharing a personal electronic device or can each be using one or more devices for video capture. The videos that are collected can be collected using a web-based framework. The web-based framework can be used to display the video media presentation or event as well as to collect videos from multiple viewers who are online. That is, the collection of videos can be crowdsourced from those viewers who elected to opt-in to the video data collection.

The videos captured from the various viewers who chose to opt-in can be substantially different in terms of video quality, frame rate, etc. As a result, the facial video data can be scaled, rotated, and otherwise adjusted to improve consistency. Human factors further contribute to the capture of the facial video data. The facial data that is captured might or might not be relevant to the video media presentation being displayed. For example, the viewer might not be paying attention, might be fidgeting, might be distracted by an object or event near the viewer, or might be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include items such as eyeglasses (because of reflections), eye patches, jewelry, and clothing that occlude or obscure the viewer's face. Similarly, a viewer's hair or hair covering can present artifacts by obscuring the viewer's eyes and/or face.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers, but can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. These AUs can be used to recognize emotions experienced by the person who is being observed. Emotion-related facial actions can be identified using the emotional facial action coding system (EM-FACS) and the facial action coding system affect interpretation dictionary (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular cognitive and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated, and specific emotions, moods, mental states, or cognitive states can be identified.

The coding of faces identified in videos captured of people observing an event can be automated. The automated systems can detect facial AUs or discrete emotional states. The emotional states can include amusement, fear, anger, disgust, surprise, and sadness. The automated systems can be based on a probability estimate from one or more classifiers, where the probabilities can correlate with an intensity of an AU or an expression. The classifiers can be used to identify into which of a set of categories a given observation can be placed. In some cases, the classifiers can be used to determine a probability that a given AU or expression is present in a given frame of a video. The classifiers can be used as part of a supervised machine learning technique, where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from differences in illumination or shadowing changes between and among video frames. The HoG can be computed on the image or on an adjusted version of the image, where the adjustment of the image can include scaling, rotation, etc. The image can be adjusted by flipping the image around a vertical line through the middle of a face in the image. The symmetry plane of the image can be determined from the tracker points and landmarks of the image.

In embodiments, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including a symmetric smile, unilateral smile, asymmetric smile, and so on. The trained system can then be used to automatically code the facial data collected from a plurality of viewers experiencing video presentations (e.g. television programs).

Spontaneous asymmetric smiles can be detected in order to understand viewer experiences. Related literature indicates that as many asymmetric smiles occur on the right hemi face as do on the left hemi face, for spontaneous expressions. Detection can be treated as a binary classification problem, where images that contain a right asymmetric expression are used as positive (target class) samples and all other images as negative (non-target class) samples. Classifiers perform the classification, including classifiers such as support vector machines (SVM) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBPs) and Local Gabor Binary Patterns (LGBPs). The HoG descriptor represents the face as a distribution of intensity gradients and edge directions and is robust in its ability to translate and scale. Differing patterns, including groupings of cells of various sizes and arranged in variously sized cell blocks, can be used. For example, 4×4 cell blocks of 8×8-pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis. This grouping and other analyses can be facilitated via semiconductor-based logic.

Figure 13:
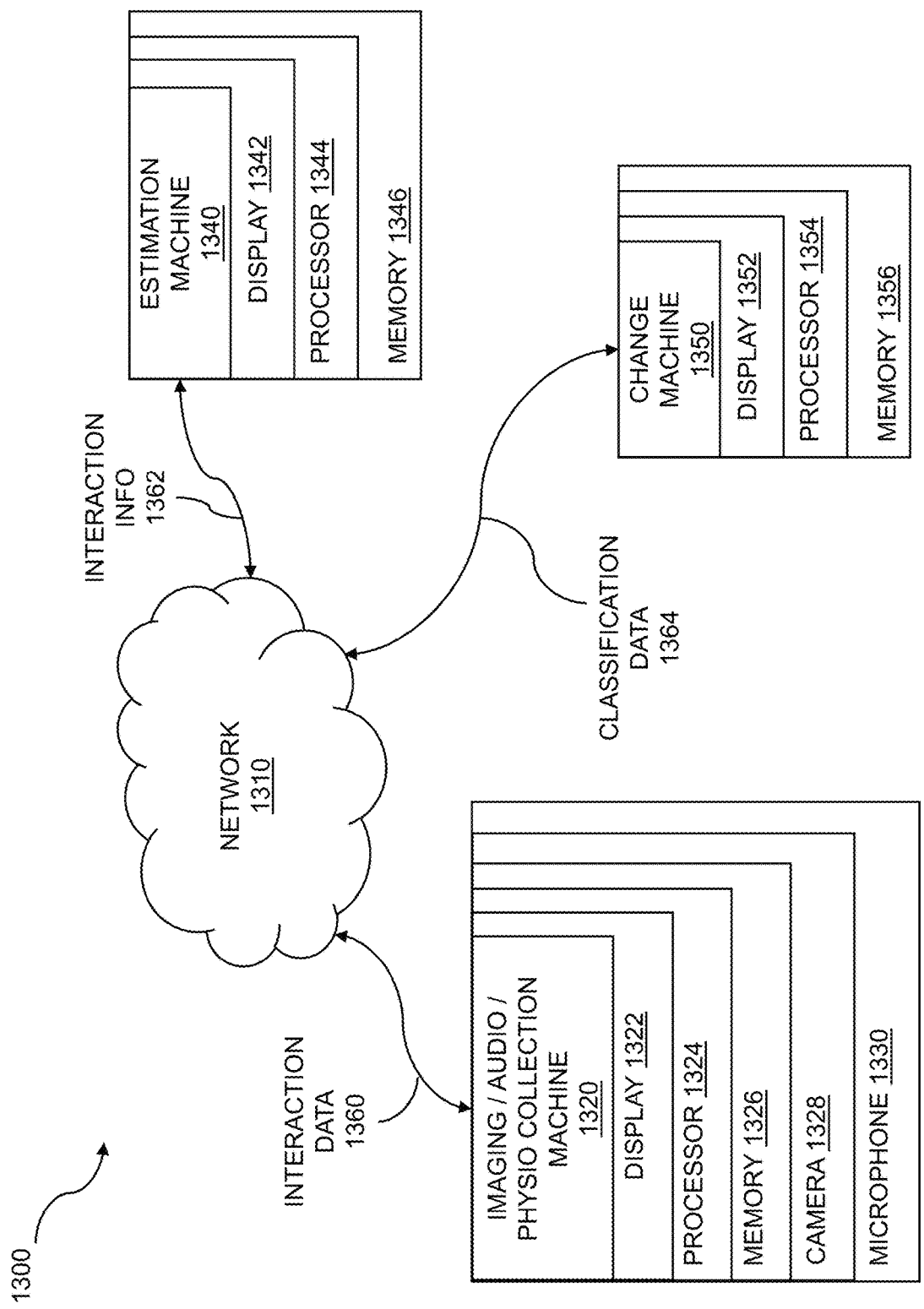
FIG. 13 is a diagram of a system for vehicle interior object management.

FIG. 13 is a diagram of a system for vehicle interior object management. An individual can interact with a vehicle or an object within the vehicle while the individual is within the vehicle. A control element of a vehicle, such as performing a lockout operation, responding to traffic or weather, adjusting audio, and so on, can be changed based on a level of interaction between the individual and an object within the vehicle. The controlling of an element of the vehicle can be based on collecting and analyzing images of the vehicle interior. The analyzing can detect that an object is present within the vehicle and whether the object is being held by the vehicle occupant, within reach of the occupant, etc. The object can be classified to determine a type of object such as a handheld device, a personal item such as a wallet or purse, a child, a pet, and the like. The analyzing and the classifying can be used to determine a level of human activity, cognitive states of the occupant, object interference, etc. Images of a vehicle interior are collected using imaging devices within the vehicle. The images are analyzed to detect an object within the vehicle, and the object is classified. A level of interaction is estimated between an occupant of the vehicle and the object. A control element of the vehicle is changed based on the classifying and the level of interaction.

The system 1300 can include a network 1310 (Internet, intranet, or another computer network), which can be used for communication among various machines. An imaging, audio, or physio collection machine 1320 has a memory 1326 which stores instructions and one or more processors 1324 attached to the memory 1326, wherein the one or more processors 1324 can execute instructions. The imaging, audio, or physio collection machine 1320 can also have a network connection to carry interaction data 1360, and a display 1322 that can present interaction data, vehicle occupant profiles, object data, mental state data, mental state profiles, cognitive state data, cognitive state profiles, emotional states, emotional state profiles, and so on. The imaging, audio, or physio collection machine 1320 can collect images of a vehicle interior. The imaging can include imaging of a vehicle interior, cognitive state data including image data, facial data, torso data, voice data, audio data, physiological data, etc., from an occupant of a vehicle. The imaging can include infrared imaging, near-infrared imaging, etc. In some embodiments, there are multiple imaging, audio, or physio collection machines 1320 that each collect imaging. This type of collection machine can have a camera 1328, a microphone 1330, or other sensors. In many embodiments, a camera, a microphone, or physiological sensors will be present. Other embodiments include obtaining audio information and augmenting the estimating (discussed below) with the audio information. The audio data can include speech, non-speech vocalizations, etc. Further embodiments may include obtaining physiological information from the occupant of the vehicle and augmenting the estimating based on the physiological information. The physiological data can include heart rate, heart rate variability, respiration rate, skin conductivity, and so on. Once the interaction data 1360 has been collected, the imaging, audio, or physio collection machine 1320 can upload information to an estimation machine 1340, based on the interaction data from the occupant of the vehicle. The imaging, audio, or physio collection machine 1320 can communicate with the estimation machine 1340 over the network 1310, the Internet, some other computer network, or by another method suitable for communication between two machines. In some embodiments, the estimation machine 1340 functionality is embodied in the imaging, audio, and physio collection machine 1320. In some embodiments, the estimation machine 1340 includes an analysis function for identifying objects contained in collected images and a classification function for classifying objects within the vehicle.

The estimation machine 1340 can have a network connection for occupant/object interaction information 1362, a memory 1346 which stores instructions, and one or more processors 1344 attached to the memory 1346, wherein the one or more processors 1344 can execute instructions. The estimation machine 1340 can receive interaction data, collected from an occupant of the vehicle, from the imaging, audio, or physio collection machine 1320, and can estimate a level of interaction between the occupant and the object. The estimation machine 1340 can also estimate further human interaction data while the occupant is in a second vehicle. In some embodiments, the estimation machine 1340 also allows a user to view and evaluate the interaction data, or other data for the occupant of the vehicle, on a display 1342. The estimation machine 1340 can then provide the interaction information 1362, classification data 1364, or other information or data to the change machine 1350. In some embodiments, the imaging, audio, or physio capture machine 1320 can also function as the change machine 1350. In further embodiments, the interaction information that was estimated can be based on intermittent obtaining of imaging that includes upper torso data.

The change machine 1350 can have a memory 1356 which stores instructions, and one or more processors 1354 attached to the memory 1356, wherein the one or more processors 1354 can execute instructions. The change machine can use a network 1310 such as a computer network, the Internet, or another computer communication method, to request the interaction information 1362 from the estimation machine. The change machine 1350 can receive classification data 1364, based on the interaction data 1360, from the occupant of the vehicle. The classification data, the interaction for the occupant, and vehicle control element change information can be presented on a display 1352. In some embodiments, the change machine is set up to receive interaction data collected from an occupant of the vehicle, in real-time or near real-time. In other embodiments, the change machine is set up to receive the interaction data on an intermittent basis. In at least one embodiment, a single computer incorporates the imaging, audio, or physio collection machine, the estimation machine, and the change machine functionalities.

The system 1300 can comprise a computer system for vehicle management comprising: a memory which stores instructions; one or more processors attached to the memory wherein the one or more processors, when executing the instructions which are stored, are configured to: collect two or more images of a vehicle interior using one or more imaging devices within the vehicle; analyze the two or more images to detect an object within the vehicle; classify the object within the vehicle; estimate a level of interaction between the object and an occupant of the vehicle; and change a control element of the vehicle based on the classifying and the level of interaction.

The system 1300 can comprise a computer program product embodied in a non-transitory computer readable medium for vehicle management, the computer program product comprising code which causes one or more processors to perform operations of: collecting two or more images of a vehicle interior using one or more imaging devices within the vehicle; analyzing the two or more images to detect an object within the vehicle; classifying the object within the vehicle; estimating a level of interaction between the object and an occupant of the vehicle; and changing a control element of the vehicle based on the classifying and the level of interaction.

Each of the above methods may be executed on one or more processors on one or more computer systems. Embodiments may include various forms of distributed computing, client/server computing, and cloud-based computing. Further, it will be understood that for each flow chart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general-purpose hardware and computer instructions, and so on. Any and all of which may be generally referred to herein as a "circuit," "module," or "system."

A programmable apparatus which executes any of the above-mentioned computer program products or computer implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random-access memory (RAM), a read-only memory (ROM), an erasable programmable read-only memory (EPROM, Flash, MRAM, FeRAM, or phase change memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples but is to be understood in the broadest sense allowable by law.

What is claimed is:

1. A computer-implemented method for vehicle management comprising:
   collecting two or more images of a vehicle interior using one or more imaging devices within the vehicle;
   determining a human perception metric based on the two or more images, wherein the human perception metric includes a cognitive load for an occupant of the vehicle;
   analyzing the two or more images to detect an object within the vehicle;
   classifying the object within the vehicle;
   collecting audio information from within the vehicle;
   matching a portion of the audio information to at least one of the two or more images;
   estimating a level of interaction between the object and the occupant of the vehicle, wherein the estimating the level of interaction includes calculating an interaction metric and wherein the estimating is also based on the matched portion of the audio information; and
   changing a control element of the vehicle based on the classifying and the level of interaction.

2. The method of claim 1 further comprising calculating a distance between the object and the occupant.

3. The method of claim 1 wherein the estimating the level of interaction is further based on other sensors within the vehicle.

4. The method of claim 1 wherein the analyzing includes determining if the object is being held by the occupant.

5. The method of claim 1 further comprising determining a cognitive load for the occupant based on the level of interaction.

6. The method of claim 1 wherein the estimating includes determining a level of distractedness by the occupant.

7. The method of claim 1 wherein the classifying provides information on object interference with the occupant.

8. The method of claim 1 wherein the analyzing includes determining occupant location within the vehicle.

9. The method of claim 1 wherein the two or more images include torso location information for the occupant.

10. The method of claim 1 further comprising determining human activity of the occupant, based on the analyzing, the estimating, and the classifying.

11. The method of claim 1 further comprising determining cognitive states of the occupant, based on the analyzing, the estimating, and the classifying.

12. The method of claim 1 further comprising tracking upper body movement of the occupant, based on the two or more images.

13. The method of claim 1 wherein the control element of the vehicle is used for optimization of an autonomous or semiautonomous vehicle.

14. The method of claim 1 further comprising determining that the object was left behind once the occupant leaves the vehicle.

15. The method of claim 1 wherein a wire-frame representation of the occupant's body is constructed from the two or more images.

16. The method of claim 1 wherein the images are collected on an intermittent basis.

17. The method of claim 1, wherein the control element of the vehicle includes one of climate control, mirror adjustment, and entertainment selection.

18. The method of claim 1 wherein the changing the control element of the vehicle is further based on the human perception metric.

19. The method of claim 1, wherein the audio information includes a plurality of unfilled pauses.

20. The method of claim 1, wherein the human perception metric is based on vehicle occupant demographics.

21. The method of claim 2 further comprising determining if the object is within a reachable distance of the occupant.

22. The method of claim 4 wherein the estimating includes determining tactile interaction, voice interaction, or human perception AI interaction between the occupant and the object.

23. The method of claim 5 wherein the determining a cognitive load includes calculating a cognitive load metric.

24. The method of claim 8 wherein the determining occupant location provides a vehicle seating map.

25. The method of claim 10 wherein the human activity includes eating, sleeping, talking to one's own self, talking to another occupant of the vehicle, using a computer, talking on a cell phone, or looking at a mobile device.

26. The method of claim 12 wherein the upper body movement includes tracking of hands of the occupant.

27. The method of claim 14 further comprising notifying the occupant that the object was left behind.

28. A computer program product embodied in a non-transitory computer readable medium for vehicle management, the computer program product comprising code which causes one or more processors to perform operations of:
   collecting two or more images of a vehicle interior using one or more imaging devices within the vehicle;

determining a human perception metric based on the two or more images, wherein the human perception metric includes a cognitive load for an occupant of the vehicle;
analyzing the two or more images to detect an object within the vehicle;
classifying the object within the vehicle;
collecting audio information from within the vehicle;
matching a portion of the audio information to at least one of the two or more images;
estimating a level of interaction between the object and the occupant of the vehicle, wherein the estimating the level of interaction includes calculating an interaction metric and wherein the estimating is also based on the matched portion of the audio information; and
changing a control element of the vehicle based on the classifying and the level of interaction.

29. A computer system for vehicle management comprising:
a memory which stores instructions;
one or more processors attached to the memory wherein the one or more processors, when executing the instructions which are stored, are configured to:
collect two or more images of a vehicle interior using one or more imaging devices within the vehicle;
determine a human perception metric based on the two or more images, wherein the human perception metric includes a cognitive load for an occupant of the vehicle;
analyze the two or more images to detect an object within the vehicle;
classify the object within the vehicle;
collect audio information from within the vehicle;
match a portion of the audio information to at least one of the two or more images;
estimate a level of interaction between the object and the occupant of the vehicle, wherein the estimating the level of interaction includes calculating an interaction metric and wherein the estimating is also based on the matched portion of the audio information; and
change a control element of the vehicle based on the classifying and the level of interaction.

\* \* \* \* \*